United States Patent
Hu et al.

(10) Patent No.: US 10,437,578 B2
(45) Date of Patent: *Oct. 8, 2019

(54) ORCHESTRATION OF SOFTWARE APPLICATIONS UPGRADE USING AUTOMATIC HANG DETECTION

(71) Applicant: Oracle International Corporation, Redwood Shores, CA (US)

(72) Inventors: Fang Hu, Dublin, CA (US); Chi Kin Vong, Chandler, AZ (US); Bhuvaneswari Thiagarajan, Fremont, CA (US); Tim Richardson, Mesa, AZ (US); Jinghuan Jay Lu, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/649,440

(22) Filed: Jul. 13, 2017

(65) Prior Publication Data
US 2017/0308373 A1     Oct. 26, 2017

Related U.S. Application Data

(63) Continuation of application No. 14/925,354, filed on Oct. 28, 2015, now Pat. No. 9,740,474.

(60) Provisional application No. 62/072,334, filed on Oct. 29, 2014.

(51) Int. Cl.
*G06F 9/44*     (2018.01)
*G06F 8/65*     (2018.01)
*H04L 29/08*     (2006.01)

(52) U.S. Cl.
CPC .............. *G06F 8/65* (2013.01); *H04L 67/34* (2013.01)

(58) Field of Classification Search
CPC ..... G06F 8/65; G06F 8/67; G06F 8/68; G06F 11/1433; G06F 11/1435; H04L 67/34
USPC ................... 717/127–128, 168–178
See application file for complete search history.

(56) References Cited

U.S. PATENT DOCUMENTS

| | | | |
|---|---|---|---|
| 5,862,325 A | 1/1999 | Reed et al. | |
| 6,088,717 A | 7/2000 | Reed et al. | |
| 6,314,567 B1 | 11/2001 | Oberhauser et al. | |
| 6,360,366 B1 | 3/2002 | Heath et al. | |
| 6,633,899 B1 | 10/2003 | Coward | |

(Continued)

OTHER PUBLICATIONS

Brecht Vancauwenberghe, "Monitoring suspended orchestrations using System Center Operations Manager", Feb. 2014, Codit Blog, https://www.codit.eu/blog/2014/02/14/monitoringsuspendedorchestrationsusingsystemcenteroperationsmanager/ , 9 pages.*

(Continued)

*Primary Examiner* — Ted T. Vo
(74) *Attorney, Agent, or Firm* — Kilpatrick Townsend & Stockton LLP

(57) ABSTRACT

In an upgrade infrastructure performing an overall upgrade operation comprising multiple upgrade processes being executed, possibly concurrently, on multiple hosts for upgrading one or more software applications hosted by hosts, automated hang detection mechanisms are disclosed for quickly, efficiently, and automatically detecting when one or more of the upgrade process are in a hang state. Different hang detection techniques are described including a metadata-driven hang detection mechanism and a code-driven hang detection mechanism.

17 Claims, 7 Drawing Sheets

(56) References Cited

U.S. PATENT DOCUMENTS

| | | |
|---|---|---|
| 6,775,830 B1 | 8/2004 | Matsunami et al. |
| 6,779,028 B1 | 8/2004 | Nakamura et al. |
| 7,080,371 B1 | 7/2006 | Arnaiz et al. |
| 7,191,187 B2 | 3/2007 | Takeshita et al. |
| 7,457,880 B1 | 11/2008 | Kim |
| 7,584,467 B2 | 9/2009 | Wickham et al. |
| 7,739,677 B1 | 6/2010 | Kekre et al. |
| 8,346,913 B2 | 1/2013 | Gao et al. |
| 8,589,535 B2 | 11/2013 | Calder et al. |
| 8,752,040 B2 | 6/2014 | Halliday |
| 9,032,053 B2 | 5/2015 | Kosuru et al. |
| 9,185,514 B1 | 11/2015 | Reeves et al. |
| 9,223,962 B1 | 12/2015 | Kashyap et al. |
| 9,495,234 B1 | 11/2016 | Hamman et al. |
| 9,740,474 B2 * | 8/2017 | Hu ............... G06F 8/65 |
| 9,753,717 B2 | 9/2017 | Hu et al. |
| 9,880,828 B2 | 1/2018 | Hu et al. |
| 2003/0005351 A1 | 1/2003 | Lim |
| 2004/0003352 A1 | 1/2004 | Bargeron et al. |
| 2004/0010808 A1 | 1/2004 | DeCarmo |
| 2004/0012613 A1 | 1/2004 | Rast |
| 2004/0030567 A1 | 2/2004 | Takeshita et al. |
| 2004/0044736 A1 | 3/2004 | Austin-Lane et al. |
| 2004/0103411 A1 | 5/2004 | Thayer et al. |
| 2005/0060355 A1 | 3/2005 | Kadyk et al. |
| 2006/0010233 A1 | 1/2006 | Fellenstein et al. |
| 2006/0015861 A1 | 1/2006 | Takata et al. |
| 2006/0184937 A1 | 8/2006 | Abels et al. |
| 2006/0218545 A1 | 9/2006 | Taguchi |
| 2006/0240803 A1 | 10/2006 | Valeriano et al. |
| 2008/0133741 A1 | 6/2008 | Kubota |
| 2008/0168434 A1 | 7/2008 | Gee et al. |
| 2008/0244555 A1 | 10/2008 | Welvaert et al. |
| 2008/0250405 A1 | 10/2008 | Farhangi et al. |
| 2009/0248801 A1 | 10/2009 | Then et al. |
| 2010/0125849 A1 | 5/2010 | Oswald et al. |
| 2010/0235823 A1 | 9/2010 | Garbers et al. |
| 2010/0241748 A1 | 9/2010 | Ansari et al. |
| 2011/0289498 A1 | 11/2011 | Xie et al. |
| 2012/0005316 A1 | 1/2012 | Perry et al. |
| 2012/0066380 A1 | 3/2012 | Gao et al. |
| 2012/0204171 A1 | 8/2012 | Reisman |
| 2013/0174178 A1 | 7/2013 | Chakraborty et al. |
| 2013/0263104 A1 | 10/2013 | Baset et al. |
| 2013/0291099 A1 | 10/2013 | Donfried et al. |
| 2013/0346922 A1 | 12/2013 | Shiplacoff et al. |
| 2014/0096076 A1 | 4/2014 | Ashbrook et al. |
| 2014/0172992 A1 | 6/2014 | Frederick et al. |
| 2014/0189015 A1 | 7/2014 | Chan et al. |
| 2014/0189030 A1 | 7/2014 | Benchenaa et al. |
| 2014/0298196 A1 | 10/2014 | Aoyama et al. |
| 2014/0304714 A1 | 10/2014 | Shapiro |
| 2014/0317522 A1 | 10/2014 | Lucero et al. |
| 2015/0067819 A1 | 3/2015 | Shribman et al. |
| 2015/0178066 A1 | 6/2015 | Horn et al. |
| 2015/0193222 A1 | 7/2015 | Pirzadeh et al. |
| 2015/0205582 A1 | 7/2015 | Iskander et al. |
| 2015/0360239 A1 | 12/2015 | Yano et al. |
| 2015/0378714 A1 | 12/2015 | Katariya et al. |
| 2016/0028667 A1 | 1/2016 | Faaborg et al. |
| 2016/0066145 A1 | 3/2016 | Pietraniec |
| 2016/0070558 A1 | 3/2016 | Hu et al. |
| 2016/0092310 A1 | 3/2016 | Peacock et al. |
| 2016/0124741 A1 | 5/2016 | Hu et al. |
| 2016/0132316 A1 | 5/2016 | Hu et al. |
| 2016/0132318 A1 | 5/2016 | Hu et al. |
| 2017/0099592 A1 | 4/2017 | Loeb et al. |
| 2017/0148280 A1 | 5/2017 | Desalle et al. |
| 2018/0024829 A1 | 1/2018 | Sung et al. |

OTHER PUBLICATIONS

Microsoft, "Orchestration Suspended Instances Availability Monitor Monitor", Oct. 2013, retrieved from http://mpwiki.viacode.com/defaultaspx?g=posts&t=164367, 2 pages.*

Kevin Greene, "SCOM 2012—Configuring Application Performance Monitoring (APM) Part 3", Mar. 2012, IT Blog, http://kevingreeneitblog.blogspot.com/2012/03/scom-2012-configuring-application_49.html , 22 pages.*

Tudor Dumitras et al., "Why Do Upgrades Fail and What Can We Do about It? Toward Dependable, Online Upgrades in Enterprise System", 2009, IFIP International Federation for Information Processing 2009, pp. 349-372.*

Carrozza et al., "Operating System Support to Detect Application Hangs", 2008, International Workshop on Verification and Evaluation of Computer and Communication Systems, 11 pages.*

What is Prevayler, Prevayler, Version 2.6, http://prevayler.org/, Jan. 15, 2013, 1 page.

U.S. Appl. No. 14/838,184, Final Office Action dated Feb. 14, 2017, 17 pages.

U.S. Appl. No. 14/838,184, Non-Final Office Action dated Aug. 11, 2016, 15 pages.

U.S. Appl. No. 14/838,184, Notice of Allowance dated Jun. 8, 2017, 10 pages.

U.S. Appl. No. 14/925,354, Non-Final Office Action dated Oct. 20, 2016, 12 pages.

U.S. Appl. No. 14/925,354, Notice of Allowance dated Apr. 12, 2017, 8 pages.

U.S. Appl. No. 14/935,112, Non-Final Office dated Oct. 25, 2016, 11 pages.

U.S. Appl. No. 14/935,112, Notice of Allowance dated May 1, 2017, 15 pages.

U.S. Appl. No. 14/935,254, Final Office Action dated May 23, 2017, 19 pages.

U.S. Appl. No. 14/935,254, Non-Final Office Action dated Dec. 14, 2016, 16 pages.

U.S. Appl. No. 14/935,254, Notice of Allowance dated Sep. 20, 2017, 13 pages.

U.S. Appl. No. 15/868,699, "Non-Final Office Action", dated Nov. 15, 2018, 13 pages.

U.S. Appl. No. 15/868,699, "Notice of Allowance", dated Apr. 3, 2019, 11 pages.

Tudor et al., "Second ACM Workshop on Hot Topics in Software Upgrades (HotSWUp 2009)", ACM, Oct. 2009.

* cited by examiner

400

```
┌─────────────────────────────────────────────────────────────┐
│ Monitor execution of a first upgrade process on a first     │
│ host machine, the first upgrade process upgrading a first   │
│ software application on the first host machine              │
│ 402                                                         │
└─────────────────────────────────────────────────────────────┘
                              │
                              ▼
┌─────────────────────────────────────────────────────────────┐
│ Access runtime execution timing data associated with the    │
│ first upgrade process executing on the first host machine   │
│ based on monitoring                                         │
│ 404                                                         │
└─────────────────────────────────────────────────────────────┘
                              │
                              ▼
┌─────────────────────────────────────────────────────────────┐
│ Compare the runtime execution timing data associated with   │
│ the first upgrade process to a first reference timing data  │
│ specified for the first upgrade process for the first host  │
│ machine, wherein the first reference timing data is         │
│ different from a second reference timing data specified     │
│ for the first upgrade process for a second host machine     │
│ different from the first host machine                       │
│ 406                                                         │
└─────────────────────────────────────────────────────────────┘
                              │
                              ▼
┌─────────────────────────────────────────────────────────────┐
│ Determine, based upon the comparing, that the first upgrade │
│ process executing on the first host machine is to be        │
│ indicated as being in a hang state                          │
│ 408                                                         │
└─────────────────────────────────────────────────────────────┘
                              │
                              ▼
┌─────────────────────────────────────────────────────────────┐
│ Generating a hang alert message indicating the first        │
│ upgrade process executing on the first host machine is in   │
│ the hang state                                              │
│ 410                                                         │
└─────────────────────────────────────────────────────────────┘
```

FIG. 4

# ORCHESTRATION OF SOFTWARE APPLICATIONS UPGRADE USING AUTOMATIC HANG DETECTION

CROSS-REFERENCES TO RELATED APPLICATIONS

This present application is a continuation of, and claims the benefit and priority of U.S. Non-Provisional patent Application Ser. No. 14/925,354, filed Oct. 28, 2015, entitled "ORCHESTRATION OF SOFTWARE APPLICATIONS USING AUTOMATIC HANG DETECTION" (now allowed), which claims the benefit of and priority to U.S. Provisional Application No. 62/072,334, filed Oct. 29, 2014, entitled "ORCHESTRATION OF SOFTWARE APPLICATIONS USING AUTOMATIC HANG DETECTION." The above-identified patent applications are hereby incorporated by reference in their entirety for all purposes.

BACKGROUND

The term upgrading a software application generally refers to the process of replacing an existing version of the software application with a newer version, adding a new version of the software application where none previously existed, or somehow changing an existing version of the software application to a newer different version. A software upgrade may be performed for various reasons such as to add one or more features, remove one or more features, modify one or more features in an existing version of the software, remove bugs or errors, improve the software efficiency, and other reasons. An upgrade is generally performed to enhance the performance of a software application.

Many modern computing environments typically include a framework of multiple heterogeneous software applications, which may be developed by different third-party entities. Each software application may include zero or more plugins. The plugins may include software components that add a new utility/feature to or enhance the utilities/features of a software application. The applications may execute on or be hosted by multiple hosts in a distributed environment, with each host potentially hosting multiple applications. Performing an upgrade operation in such a heterogeneous distributed environment comprises executing multiple upgrade processes possibly concurrently on multiple hosts to upgrade applications hosted by the hosts. The overall upgrade operation performed in such an environment is further complicated due to the possible dependencies among the upgrade processes that make up the overall upgrade operation.

Given the complexity of performing software upgrades in a heterogeneous distributed computing environment, it is very difficult to determine when something has gone wrong. For example, it is very difficult to determine if and when a particular upgrade process has stopped functioning properly, for example, if the upgrade process has frozen and entered a hang state. For example, an upgrade process may be considered to have entered a "hang state" when the upgrade process has frozen execution before completion of the upgrade process and is no longer able to resume normal operation from its frozen state. An upgrade process in a hang state may not even respond to any inputs. Due to potential dependencies between the various upgrade processes that may be executed as part of the overall upgrade operation, the hanging of a first upgrade process may in turn cause a second upgrade process to hang, and so on. This may result in a chain reaction causing multiple upgrade processes to hang or freeze and potentially even cause the entire upgrade operation to enter a state in which no upgrade processes or activities can be continued or carried out.

Conventionally, the detection of a hung upgrade process is done manually, typically when an operator detects that an upgrade process has been executing much longer than expected. The operator typically has to manually examine and analyze data generated by the upgrade process, such as log files, etc., to determine or confirm whether the upgrade process is indeed in a hang state or just taking a longer time to complete. This detection may not occur until after a very long time after the upgrade process has transitioned in a hang state and consequently corrective actions for handling the hang scenario (e.g., killing the upgrade process and restarting it) may not be initiated until an inordinate amount of time has been wasted.

Some conventional systems include diagnostic tools that try to detect a hung thread from among multiple threads in a single multithreaded process, where the thread executes in the process' execution environment. The detection is thus limited to a thread within a single process. Moreover, such tools use a single pre-defined threshold configured for the tool for such detection and cannot be customized for different upgrade processes for different heterogeneous hosts. Also, in such systems, the single pre-defined threshold is set to a high threshold value to avoid false alarms or false positives (i.e., to avoid indication of a hang situation when in reality no hang exists). This high threshold value makes its use pretty useless since several hang scenarios cannot be detected until much later in time until the high threshold value has been reached or exceeded. Consequently, such diagnostic tools cannot be used in heterogeneous computing environments where a large number of upgrade processes are being executed, possibly many in parallel, on hosts of differing capabilities.

BRIEF SUMMARY

The present disclosure relates generally to managing upgrading software applications executing on multiple hosts. In certain embodiments, techniques are disclosed for enabling multiple software applications potentially executing on multiple hosts to be upgraded using a hang monitor for automatic hang detection. The hang monitor may detect and report a hang soon after the hang occurs.

In certain embodiments, one or more applications running or executing on multiple hosts may be upgraded concurrently. One or more upgrade processes may execute on the multiple hosts to upgrade each application. As part of the overall upgrade operation, a hang monitor may monitor the upgrade processes to automatically detect when an upgrade process transitions into a hang state soon after the hang occurs. Each upgrade process may have an reference execution time. In some embodiments, a latency threshold period may also be associated with each upgrade process. The hang monitor may determine that an upgrade process is to be indicated as being in the hang state if the upgrade process has been executing for more than the reference execution time plus the applicable latency threshold period. The reference execution time and the latency threshold associated with an upgrade process may be based on the host where the upgrade process executes. For example, the same upgrade process may have a shorter reference execution time and a shorter latency threshold when the upgrade process executes on a fast-executing host compared to when the upgrade process executes on a slow-executing host.

The hang monitor may determine that an upgrade process has transitioned into a hang state using a metadata-driven technique, a code-driven technique or a combination thereof. For example, using the metadata-driven technique, the hang monitor may have access to reference timing metadata associated with the upgrade processes. The reference timing metadata may include the reference execution time and the latency threshold associated with each upgrade process. The hang monitor may monitor the execution of all upgrade processes and compare their execution time to the reference timing metadata. On the other hand, using the code-driven technique, a hang detection code may be inserted in the upgrade processes. The hang detection code may monitor the execution of the upgrade process that contains the hang detection code. When the hang detection code determines that the upgrade process is to be indicated as being in the hang state, the hang detection code may inform the hang monitor. The hang monitor may generate an alert message for the user, e.g. system administrator.

In certain embodiments, techniques (including methods, systems, code or software instructions executed by one or more processors) are provided for monitoring execution of a first upgrade process on a first host machine. The first upgrade process upgrading a first software application on the first host machine. The hang monitor may access runtime execution timing data for the first upgrade process. The runtime execution timing data captured for the first upgrade process during the monitoring of the execution of the first upgrade process. For example, the hang monitor may receive the runtime execution timing data from the first upgrade process (i.e. the push technique). In some embodiments, the hang monitor may retrieving the runtime execution timing data from the first upgrade process (i.e. the pull technique). Alternatively, the first upgrade process may write the runtime execution timing data to a storage and the hang monitor may retrieve the runtime execution timing data from the storage. The hang monitor may compare the runtime execution timing data associated with the first upgrade process to a first reference timing data specified for the first upgrade process for the first host machine, wherein the first reference timing data is different from a second reference timing data specified for the first upgrade process for a second host machine different from the first host machine. Accordingly, the first reference timing data may be dependent upon executing the first upgrade process on the first host machine. For example, the first reference timing data may have a first value when the first upgrade process executes on the first host machine and a second value when the first upgrade executes on a host machine different than the first host machine. The first reference timing data may be provided to the hang monitor in form of metadata associated with the upgrade process. In certain embodiments, the metadata may be stored at a storage accessible by the hang monitor. Yet in other embodiments, the hang monitor may determine the reference timing metadata at run-time, i.e. during execution of the first upgrade process. Based on the comparing, the hang monitor may determine that the first upgrade process executing on the first host machine is to be indicated as being in the hang state. The hang monitor may then generate a hang alert message indicating the first upgrade process executing on the first host machine is in the hang state. The hang alert message may identify one or more of a cause of the hang, a location of the hang, and a time of the hang.

In some embodiments, the hang monitor may continue monitoring the first upgrade process and determine that the first upgrade process resumed execution. The hang monitor may generate an update message indicating that the first upgrade process is now in a normal state, i.e. that the first upgrade process is no longer in a hang state.

In certain embodiments, the first reference timing data may include a first reference execution time of the first upgrade process such that the hang alert message is generated upon determining that the first upgrade process continues execution after the first reference execution time has passed. In other embodiments, the first reference timing data may include, in addition to the first reference execution time, a first latency tolerance time associated with the first upgrade process. Alternatively, the hang monitor may determining a latency tolerance time for the first upgrade process based on the runtime execution timing data associated with the first upgrade process. In such embodiments, the hang alert message is generated upon determining that the first upgrade process continues execution after a total of the first reference execution time and the first latency tolerance time has passed.

In certain embodiments, a second upgrade process may be executed on the first host machine for upgrading the first software application on the first host machine. Accordingly, multiple upgrade processes may execute on the same host. The hang monitor in communication with the first host machine may also monitor execution of the second upgrade process on the first host machine. The hang monitor may access runtime execution timing data for the second upgrade process. The runtime execution timing data captured for the second upgrade process during the monitoring of the execution of the second upgrade process. For example, the hang monitor may receive the runtime execution timing data from the second upgrade process (i.e. the push technique). In some embodiments, the hang monitor may retrieving the runtime execution timing data from the second upgrade process (i.e. the pull technique). Alternatively, the second upgrade process may write the runtime execution timing data to a storage and the hang monitor may retrieve the runtime execution timing data from the storage. The hang monitor may compare the runtime execution timing data associated with the second upgrade process to a first reference timing data specified for the second upgrade process for the first host machine, wherein the first reference timing data is different from a second reference timing data specified for the second upgrade process for a second host machine different from the first host machine. Accordingly, the second reference timing data may be dependent upon executing the second upgrade process on the first host machine. The second reference timing data may be provided to the hang monitor in form of metadata associated with the second upgrade process. In certain embodiments, the metadata may be stored at a storage accessible by the hang monitor. Yet in other embodiments, the hang monitor may determine the reference timing metadata at run-time, i.e. during execution of the second upgrade process. Based on the comparing, the hang monitor may determine that the second upgrade process is to be indicated as being in the hang state. The hang monitor may then generate a hang alert message indicating the second upgrade process is in the hang state.

In other embodiments, the second upgrade process may be executed on a second host machine for upgrading a second software application on the second host machine. Accordingly, multiple upgrade processes may execute on multiple hosts. The hang monitor may be in communication with the second host machine and may also monitor execution of the second upgrade process. The hang monitor may runtime execution timing data for the second upgrade process, the runtime execution timing data captured for the second upgrade process during the monitoring of the execution of the second upgrade process. For example, the hang monitor may receive the runtime execution timing data from the second upgrade process (i.e. the push technique). In some embodiments, the hang monitor may retrieving the runtime execution timing data from the second upgrade process (i.e. the pull technique). Alternatively, the second upgrade process may write the runtime execution timing data to a storage and the hang monitor may retrieve the runtime execution timing data from the storage. The hang monitor may compare the runtime execution timing data associated with the second upgrade process to a first reference timing data associated with the second upgrade process, wherein the first reference timing data is defined for the second upgrade process and based on the second upgrade process executing on the second host machine, wherein the first reference timing data is different than a second reference timing data defined for the second upgrade process based on the second upgrade process executing on the first host machine. Accordingly, the second reference timing data may be dependent upon executing the second upgrade process on the second host machine. The second reference timing data may be provided to the hang monitor in form of metadata associated with the second upgrade process. In certain embodiments, the metadata may be stored at a storage accessible by the hang monitor. Yet in other embodiments, the hang monitor may determine the reference timing metadata at run-time, i.e. during execution of the second upgrade process. Based on the comparing, the hang monitor may determine that the second upgrade process is to be indicated as being in the hang state. The hang monitor may then generate a hang alert message indicating the second upgrade process is in the hang state.

In certain embodiments, techniques (including methods, systems, code or software instructions executed by one or more processors) are provided for monitoring execution of a first upgrade process on a first host machine using a hang monitor. The first upgrade process may upgrade a first software application on the first host machine. The hang monitor may access runtime execution timing data associated with the first upgrade process based on monitoring. The hang monitor may compare the runtime execution timing data associated with the first upgrade process to a first reference timing data associated with the first upgrade process. The first reference timing data may be provided to the hang monitor (or stored at a location accessible by the hang monitor) in form of reference timing metadata. Based on the comparing, the hang monitor may determine that the first upgrade process is to be indicated as being in the hang state. The hang monitor may generate a hang alert message indicating the first upgrade process is in the hang state. In certain embodiments, the hang monitor may continue to monitor the first upgrade process and determine that the first upgrade process resumed execution. The hang monitor may generate an update message indicating that the first upgrade process is no longer in a hang state.

In certain embodiments, techniques (including methods, systems, code or software instructions executed by one or more processors) are provided for monitoring execution of a first upgrade process on a first host machine using a first code incorporated into the first upgrade process. The first upgrade process may upgrade a first software application on the first host machine. The first code may access runtime execution timing data associated with the first upgrade process based on monitoring. The first code may compare the runtime execution timing data associated with the first upgrade process to a first reference timing data associated with the first upgrade process. Based on the comparing, the first code may determine that the first upgrade process is to be indicated as being in the hang state. The first code may be in communication with a centralized proxy. Upon determining that the first upgrade process is to be indicated as being in the hang state, the first code may report that the first upgrade process is in the hang state to the centralized proxy. The centralized proxy may generate a hang alert message indicating the first upgrade process is in the hang state. In certain embodiments, the first code may continue to monitor the first upgrade process and determine that the first upgrade process resumed execution. The first code may notify the centralized proxy that the hang is resolved. The centralized proxy may generate an update message indicating that the first upgrade process is no longer in a hang state.

These and other embodiments are described in further detail below.

BRIEF DESCRIPTION OF THE DRAWINGS

Illustrative embodiments of the present invention are described in detail below with reference to the following drawing figures:

FIG. 4 shows a method performed by a hang monitor provided in an upgrade infrastructure executing multiple upgrade processes on multiple hosts according to an embodiment of the present invention.

DETAILED DESCRIPTION

Figure 1:
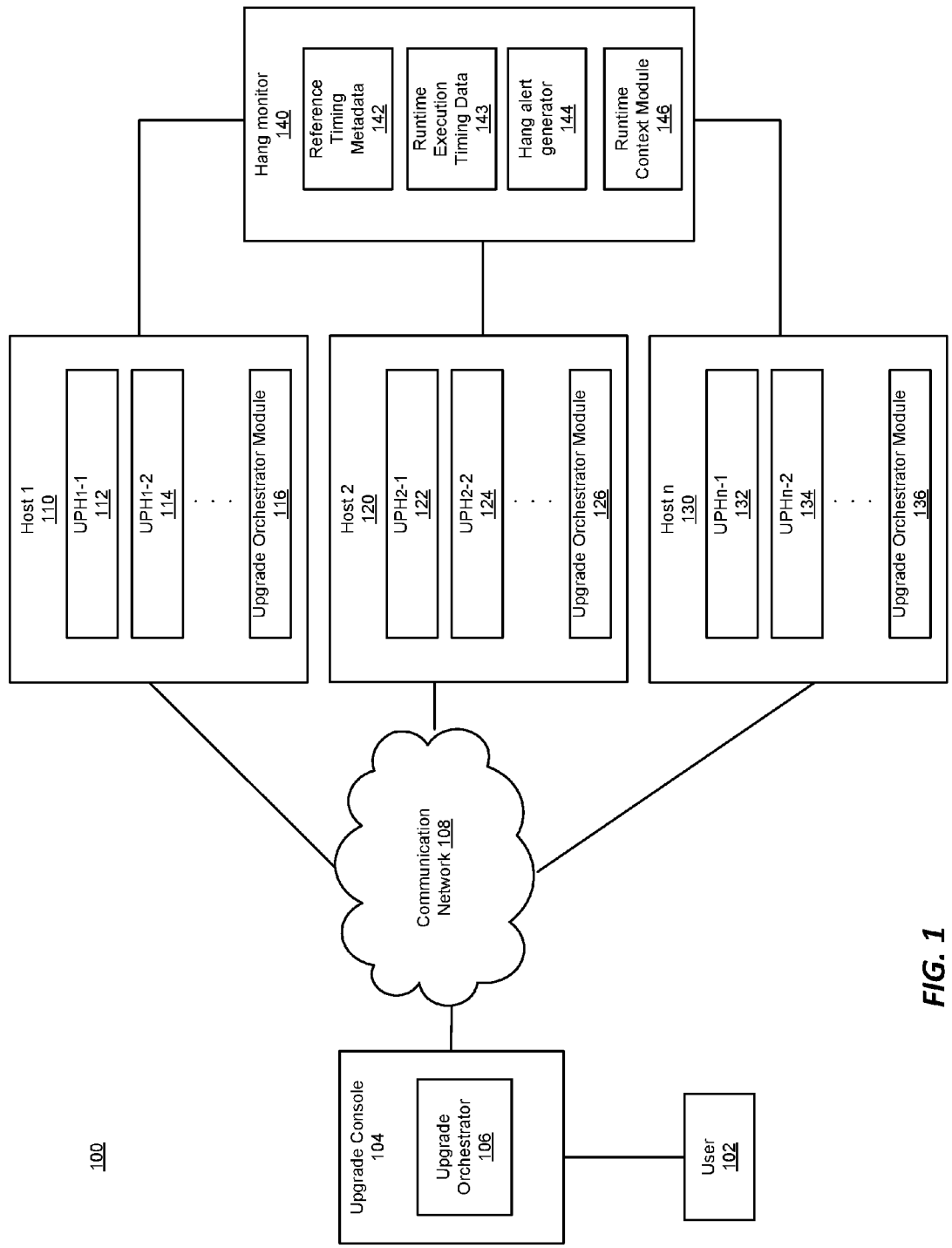
FIG. 1 depicts an upgrade infrastructure for executing multiple upgrade processes on multiple hosts using metadata-driven automatic hang detection according to an embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks.

An improved upgrade infrastructure is provided for performing software upgrades in a distributed heterogeneous computing environment comprising multiple hosts hosting multiple software applications. A host, as used herein, refers to any computing device comprising one or more processors. A host may be configured to host one or more software applications. The configuration (e.g., processing capabilities, memory resource capabilities, networking resource capabilities, operating systems (e.g., Windows, iOS, UNIX, LINUX, etc.) on the hosts, etc.) of a host in the computing environment may be the same as or different from another host in the computing environment. Accordingly, the computing environment in which the software upgrade is to be performed may comprise heterogeneous hosts of different configurations and capabilities.

Various different types of software applications may be hosted by a host or by multiple hosts, such as, without limitation, enterprise applications, resource planning applications, business applications, productivity applications, and the like. The applications hosted by one host may be same as or different from the applications hosted by another host in the computing environment. For example, two hosts may host the same customer relationship management (CRM) application. As another example, a first host may host one or more customer relationship management (CRM) applications while a second host may host one or more supply chain management applications. Further, even for a given software application, different hosts may host different versions of the same application. The software applications hosted by the hosts may be developed by same or different third-party entities.

Due to the heterogeneity of the computing environment, the task of performing software upgrades in such an environment is very complicated. The complexity of performing such a distributed upgrade is impacted and complicated by several factors such as the number of applications that need to be upgraded, the different types of applications, the distributed nature of the applications, potential dependencies between the applications, the number of hosts involved in the overall upgrade operation, differences in configurations and/or capabilities of the hosts, potential upgrade dependencies between the upgrade processes that are responsible for upgrading the applications hosted by the same or different hosts, customized upgrade requirements for different applications, and other factors.

According to an embodiment of the present invention, an improved upgrade infrastructure is provided for performing software upgrades in such a distributed heterogeneous environment in an automated and efficient manner. The upgrade infrastructure is configured to initiate and manage an upgrade operation that is responsible for performing software upgrades across the multiple hosts. In certain embodiments, as part of the overall upgrade operation, multiple upgrade processes are started and executed on the multiple hosts, where an upgrade process executed on a host is configured to upgrade one or more software applications hosted by that host. For example, upgrading a software application may include replacing an existing version of the software application with a newer version, adding a new version of the software application where none previously existed, or somehow changing an existing version of the software application to a newer different version. The upgrade processes may add one or more features, remove one or more features, modify one or more features from an existing version of the applications, remove bugs or errors, improve the software efficiency, and the like.

One or more such software upgrade processes may be executed by a host. Some of the upgrade processes on the same host or across multiple different hosts may be executed in parallel, i.e., one or more software applications on the same host or across multiple hosts may be upgraded concurrently. Further, the upgrade infrastructure can also enable two or more upgrade processes executing on the same host or executing on multiple different hosts to synchronize and coordinate their upgrade activities in an automated manner.

A host, as used herein, refers to any computing device or machine comprising one or more processors. Various different software applications may be hosted by the hosts in a distributed environment. A host may host and/or execute one or more software applications. The software applications may include, various types of applications, such as enterprise resource planning software applications that can be used to collect, store, manage, process, analyze and interpret data from many business activities, customer relationship management (CRM) applications, supply chain management applications, or the like. The same application may be hosted by multiple hosts. Different versions of an application may be hosted by different hosts.

The software applications hosted by the hosts may be developed by different third-party entities. Due to the heterogeneity of the software applications and further coupled with the distributed nature of the computing environment, the process of upgrading such applications is quite complicated. In certain embodiments, the overall upgrade operation of upgrading multiple applications across multiple hosts comprises executing one or multiple software upgrade tasks on each of the hosts for upgrading the various pieces of software applications hosted by that host. The complexity of performing and managing such a distributed upgrade process is impacted by several factors such as the number of applications that need to be upgraded, the distributed nature of the applications, potential upgrade dependencies between upgrade processes for the applications hosted by the same or different hosts, customized upgrade requirements for individual applications, the number of hosts involved in the overall upgrade operation, and other factors.

As part of the improved upgrade infrastructure, in certain embodiments, techniques (including methods, systems, code or software instructions executed by one or more processors) are provided for automatically and efficiently detecting when an upgrade process has hung, i.e., is in a hang state. In certain embodiments, a hang condition may occur when an upgrade process has frozen execution before completion of the upgrade process and the upgrade process is no longer able to resume normal operation from its frozen state. In some instances, an upgrade process that is in a hang state may not even be responding to any inputs. In certain embodiments, a detector ("hang monitor") is provided that is configured to monitor the execution of upgrade process across the multiple hosts in the computing environment being upgraded, automatically detect and determine when an upgrade process is in a hang state, and take corrective actions (e.g., report the hang condition for the specific upgrade process) automatically detect and report hang conditions.

In certain embodiments, the hang monitor uses timing thresholds information to detect when an upgrade process is to be indicated as being in the hang state. In certain embodiments, the timing thresholds information comprises information identifying one or more upgrade processes and an associated execution time for each upgrade process, where the execution time for an upgrade process indicates the time approximated for the completion of that upgrade process. In one embodiment, for an upgrade process being executed on host, the hang monitor is configured to monitor the time of execution of the upgrade process and if the time of execution for that upgrade process exceeds the execution time associated with that upgrade process in the timing thresholds information, the hang monitor deems that process to be in a hang state and takes corrective action.

The execution time threshold for one upgrade process may be the same as or different from the execution time threshold associated with a different second upgrade process. The timing thresholds can also be customized to individual host environments. For example, the execution time thresholds for an upgrade process may be provided on a per host basis. For example, for the same upgrade process that is executed on a first host and a second host, the execution time threshold associated with that upgrade process for the first host may be different from the execution time threshold associated with that same upgrade process for the second host. This may be because of the differences in configuration and/or capabilities between the first host and the second host. In this manner, the time thresholds are customized for an upgrade process on a per host basis. In certain embodiments, the timings thresholds information may be dynamically calculated based upon the environment.

It is desirable that a hang condition for an upgrade process be detected and reported soon after the hang occurs. A late recognition and handling of the hang can cause an overall delay for the overall upgrade operation. This is especially important when there are dependencies between upgrade processes and the hanging of one upgrade process can cascade into other upgrade process being hung. But, at the same time, false positives should be avoided, where an upgrade process is erroneously identified as being in the hang state. In certain embodiments, the values of the timing thresholds are set such that a hang condition is detected as soon as possible after an upgrade process enters the hang state while, at the same time, giving sufficient timing buffer such that false positives (i.e., false hang alarms) are not generated. In certain embodiments, the thresholds are set such that the hang monitor is able to automatically detect and report a hang condition for an upgrade process within a few seconds after the hang occurs. The built-in hang detection techniques described herein significantly reduce the time taken for the overall upgrade operation since upgrade processes that are in a hang state can be detected automatically in a timely manner. This in turn also enables corrective actions to recover from the hang state to be initiated quickly. As a result, the overall time taken for the overall upgrade operation is reduced.

Various different techniques may be used for detecting hang conditions. For example, in certain embodiments, the determination of whether or not an upgrade process is in a hang state may be based upon metadata associated with the upgrade process. In certain other embodiments, the determination of whether or not an upgrade process is in a hang state may be code-driven. In some embodiments, multiple techniques may be used together, for example, in certain embodiments both metadata-based and code driven techniques may be employed.

In certain embodiments in which the hang state detection for an upgrade process is based upon metadata associated with an upgrade process, a hang monitor may be provided that interacts with the various hosts to monitor the execution of upgrade processes executed by the various hosts. The hang monitor may have been provided with or may have access to a storage that stores reference timing metadata associated with the upgrade processes. In some embodiments, the hang monitor may determine the reference timing metadata by analyzing the upgrade processes. For each monitored upgrade process, the hang monitor may monitor the time of execution of the upgrade process and compare this with reference timing metadata (e.g. reference time of execution) specified or defined for that upgrade process. Based upon this comparison, the hang monitor may determine whether or not an upgrade process is in a "hang state," where the hang state is defined based upon the time of execution of the upgrade process and the reference timing metadata. For example, the hang monitor may determine that an upgrade process is to be indicated as being in the hang state when the monitored time of execution (monitored at runtime) exceeds the reference timing metadata. If the hang monitor determines that the upgrade process is to be indicated as being in the hang state, then the hang monitor may cause a message to be sent or an alarm to be raised indicating that the upgrade process is in the hang state. The metadata-based hang detection is described below in greater detail in connection with FIG. 1.

In certain embodiments, the reference timing metadata for an upgrade process may indicate the reference execution time length (e.g. 60 minutes) of the upgrade process or the expected time of completion (2:00 pm EST on Jan. 1, 2014) of the upgrade process. The reference execution time length or expected time of completion for a process may be user-specified. In certain embodiments, the user-defined estimated reference execution time (either as length or time of completion) of an upgrade process may be provided as part of the metadata definition of that upgrade process. In such an embodiment, if the reference execution time for an upgrade process is specified as a time length (e.g., 60 minutes) then the hang monitor may determine that the upgrade process being executed by a host is to be indicated as being in the hang state when the runtime time of execution length of the upgrade process exceeds the specified reference execution time length. For example, if the reference timing metadata for an upgrade process indicates that the reference execution time length for the upgrade process is 60 minutes and the hang monitor determines that the upgrade process has already been executing for more than 60 minutes, then the hang monitor may determine that the upgrade process is to be indicated as being in the hang state and cause a message indicative of this state to be sent to a user such as a system administrator. If the reference execution time for an upgrade process is specific as a time of completion (e.g., 2:00 pm EST on Jan. 1, 2014) then the hang monitor may determine that the upgrade process being executed by a host is to be indicated as being in the hang state when the current time is past the reference time and the upgrade process has still not finished execution. For example, if the current time is already past 2:00 pm EST on Jan. 1, 2014 and the upgrade process is still executing. In this manner, instead of waiting for a long period of time, e.g. a day, to manually find out that the upgrade process is to be indicated as being in the hang state, the hang monitor enables this condition to be detected soon after the expected time of completion has been exceeded in an automated manner.

In some embodiments, in addition to the timing metadata comparison, additional analysis may be performed to confirm that the upgrade process is actually in a hang state. This is typically done to prevent and minimize the chance of identifying false positives, wherein runtime execution analysis seems to indicate that the upgrade process is in a hang state but in actuality this is not the case. For example, this may occur when the upgrade process is executing extremely slow, possibly due to reduced availability of system resources (e.g., memory and processing resources). Thus, the extended runtime execution time of the upgrade process may not be caused by a hang state.

In certain embodiments this is achieved by providing a reasonable latency, which is then added to the reference execution time information (length or the expected time of completion) of an upgrade process to prevent detection of false positives. In such embodiments, the reference timing metadata associated with an upgrade process may comprise (a) an reference execution time (length or expected time of completion) of the upgrade process and (b) a reasonable latency time value beyond the expected execution time. In such an embodiment, the hang monitor may determine that an upgrade process is to be indicated as being in the hang state when the runtime time of execution of the process exceeds the reference expected execution time (specified as time length or specific completion time) of the upgrade process plus the reference reasonable latency, i.e., upgrade process in "hang" state if runtime time of execution of the upgrade process is greater than or later than ((reference execution time of the upgrade process)+(reference reasonable latency)). For example, if the reference timing metadata for an upgrade process indicates that the reference execution time length for the upgrade process is 30 minutes and the reasonable latency is 15 minutes, the hang monitor may determine that the upgrade process is to be indicated as being in the hang state when the hang monitor determines that the upgrade process has already been executing for more than 45 minutes. The hang monitor may then cause a message indicative of this state to be sent to a user such as a system administrator. If the reference execution time for an upgrade process is specific as a time of completion (e.g., 2:00 pm EST on Jan. 1, 2014) and the reasonable latency is 15 minutes, then the hang monitor may determine that the upgrade process being executed by a host is to be indicated as being in the hang state when the current time is past the reference time plus the reference reasonable latency and the upgrade process has still not finished execution. For example, if the current time is already past 2:15 pm EST on Jan. 1, 2014 and the upgrade process is still executing. In this manner, instead of waiting for a long period of time, e.g. a day, to manually find out that the upgrade process is to be indicated as being in the hang state, the hang monitor enables this condition to be detected soon after the expected time of completion has been exceeded in an automated manner.

The reference execution time parameter and the reference reasonable latency timing parameter for an upgrade process may depend upon various criteria. For example, the timing parameters may depend upon the host on which the upgrade process is executing, i.e., may be host specific. Accordingly, for the same upgrade process, the reference execution time may be different for the upgrade process for two different hosts. For example, the reference execution time for the upgrade process may be smaller on a host with greater and faster processing resources than for a host with lesser processing resources.

Likewise, for the same upgrade process, the specified reference reasonable latency may be different for a first host versus a second host. For example, the reference reasonable latency for the upgrade process may be smaller on a host with greater and faster processing resources than for a host with lesser processing resources. In certain embodiments, the reference reasonable latency may be defined for a given host instead of a per upgrade process basis. For example, a first host may be assigned a first reference reasonable latency. Accordingly, all upgrade processes executing on the first host may have the first reference reasonable latency. For example, the Host A may be assigned a reference reasonable latency of 10 minutes. Accordingly, all upgrade processes executing on Host A may their respective reference execution time parameter and a reference reasonable latency of 10 minutes. For example, a first upgrade process executing on Host A may have an reference execution time parameter of 30 minutes and the reference reasonable latency of 10 minutes. The hang monitor may determine the first upgrade process to be in a hang state if the first upgrade process is still executing after 45 minutes. A second upgrade process executing on Host A may have a time of completion (e.g., 2:00 pm EST on Jan. 1, 2014) and the reference reasonable latency of 10 minutes. The hang monitor may determine the second upgrade process to be in a hang state if the current time is already past 2:10 pm EST on Jan. 1, 2014 and the second upgrade process is still executing.

In other embodiments, the reference reasonable latency may be defined per upgrade process instead of a per host basis. For example, a first upgrade process may be assigned a first reference reasonable latency. Accordingly, the first upgrade process may have the first reference reasonable latency no matter which host the first upgrade process executes on. For example, the first upgrade process may be assigned a first reference execution time parameter of 30 minutes and a reference reasonable latency of 10 minutes when executing on Host A. The hang monitor may determine the first upgrade process to be in a hang state if the first upgrade process is still executing after 45 minutes. The first upgrade process may be assigned a second reference execution time parameter of 60 minutes and the reference reasonable latency of 10 minutes when executing on Host B. The hang monitor may determine the first upgrade process to be in a hang state if the first upgrade process is still executing on Host B after 75 minutes. Alternatively, the first upgrade process executing on Host C may have a time of completion (e.g., 2:00 pm EST on Jan. 1, 2014) and the reference reasonable latency of 10 minutes. The hang monitor may determine the first upgrade process to be in a hang state if the current time is already past 2:10 pm EST on Jan. 1, 2014 and the first upgrade process is still executing on Host C.

In certain embodiments, hang state detection may be code-driven. In such an embodiment, an explicit hang detection mechanism (e.g., hang detection code) may be provided within the code for the upgrade processes. The code-driven technique is especially useful for upgrade processes that have a long execution time. For example, consider an upgrade process (e.g., a given program installer) that has an expected execution time of over 6 hours, i.e., the reference execution time for the upgrade process is 6 hours. Using the reference timing metadata technique described above, the earliest that a hang can be detected for this upgrade process is after 6 hours. Accordingly, even when the upgrade process enters a hang state much earlier than the 6 hours, say within 10 minutes after the upgrade process starts execution, the upgrade infrastructure will not be able to detect the hang efficiently until the upgrade process is overdue, i.e., after the 6 hours threshold has passed. In such a case, it may be desirable for the upgrade process to have a built-in monitor thread (e.g., built-in code) to detect the hang state internally and report the hang state to the hang monitor. The code-driven hang detection is described below in greater detail in connection with FIG. 2 below.

FIG. 1 depicts an exemplary upgrade infrastructure (e.g. upgrade system) 100 according to an embodiment of the present invention. The upgrade infrastructure 100 includes multiple hosts 110, 120, 130. While three hosts are depicted in FIG. 1, in alternative configurations more or fewer hosts may be present. The hosts 110, 120, 130 may host multiple software applications (not shown). As part of the overall upgrade operation, multiple upgrade processes 112, 114, 122, 124, 132, 134 may be executed by the hosts 110, 120, 130 to upgrade the software applications hosted by hosts 110, 120, 130.

In certain embodiments, one or more hosts may be grouped together and referred to as a pod. A pod, as used herein, defines a modular set of resources including, for example, a specific set of infrastructure, middleware, and/or application resources.

In the embodiment depicted in FIG. 1, the upgrade infrastructure 100 includes an upgrade console 104 in communication with the hosts 110, 120, 130 through a communication network 108. The upgrade console 104 may be a computing system that a user 102 (e.g. a system administrator) may interact with to initiate and control the overall upgrade operation on the hosts 110, 120, 130. In the embodiment shown in FIG. 1, the upgrade console 104 may include and execute an upgrade orchestrator 106 for initiating and managing the overall upgrade operation, including the initiating, coordinating and synchronizing the execution of upgrade processes 112, 114, 122, 124, 132, 134 on the hosts 110, 120, 130. Status information related to the status of the overall upgrade operation may be output to the user via upgrade console 104.

In certain embodiments, the overall upgrade operation may be performed in phases. During each phase, one or more upgrade processes may execute on one or more of the hosts 110, 120, 130. The upgrade orchestrator 106 may ensure that a current set of upgrade processes execute to successful completion before initiating and proceeding with the next set of upgrade processes. One of ordinary skill in the art will appreciate that the upgrade infrastructure 100 may include any number of components, hosts and upgrade processes. Thus, the upgrade infrastructure 100 is not limited to the components, hosts and upgrade processes illustrated in FIG. 1.

As illustrated in FIG. 1, multiple upgrade processes are shown executing on each one of the hosts 110, 120, 130. For example, upgrade processes 112, 114 may execute on host 110, upgrade processes 122, 124 may execute on host 120 and upgrade processes 132, 134 may execute on host 130. Two or more of the upgrade processes 112, 114, 122, 124, 132, 134 may execute in parallel. In some embodiments, two or more of the upgrade processes 112, 114, 122, 124, 132, 134 may be serialized. In some embodiments, the upgrade orchestrator 106 may also synchronize and/or coordinate the execution of two or more of the upgrade processes 112, 114, 122, 124, 132, 134.

In certain embodiments, each host is configured to execute a upgrade orchestrator module that communicates with upgrade orchestrator 106 and facilitates the upgrade activities performed on that host. For example, as depicted in FIG. 1, host 110 executes upgrade orchestrator module 116, host 120 executes upgrade orchestrator module 126, and host 130 executes upgrade orchestrator module 136. In certain embodiments, each upgrade orchestrator module may be a piece of code executing on a host for facilitating the upgrade activities. The upgrade orchestrator modules 116, 126, 136 may initiate and control the upgrade processes 112, 114, 122, 124, 132, 134 executed on the hosts 110, 120, 130. The upgrade orchestrator modules 116, 126, 136 may receive and/or respond to commands and instructions from the upgrade console 104 to facilitate the overall upgrade operation on the hosts 110, 120, 130.

The upgrade infrastructure 100 illustrated in FIG. 1 also includes a hang monitor 140. According to various embodiments, the hang monitor 140 may be (1) a separate computer system that is configured to provide hang detection functions as described above; (2) part of the upgrade console 104; (3) one of the hosts 110, 120, 130; or (4) a group of multiple hosts, where the hang detection functionality is distributed among the hosts in the multiple hosts. The hang monitor 140 may be in communication with the hosts 110, 120, 130 to monitor the execution of the upgrade processes 112, 114, 122, 124, 132, 134.

As described above, in certain embodiments, the hang monitor 140 may perform hang detection based upon reference timing metadata information. For example, the reference information may comprise reference execution times information (expressed as time length or an expected time of completion) for each of upgrade processes 112, 114, 122, 124, 132, 134. The reference information 142 may be stored in a storage location accessible to the hang monitor 140. For example, as depicted in FIG. 1, it is stored locally on hang monitor 140. In some other embodiments, the reference timing metadata information may be stored at a storage location remote from the hang monitor 104 but accessible by hang monitor 140, for example, via communication network 108.

The reference execution time that is to be used as a reference for an upgrade process may be specified by a system administrator, a developer of the upgrade process, a user, or other entity affiliated with the development and administration of the upgrade process. In various embodiments, different reference execution times may be specified for a given upgrade process for different hosts (or types of hosts). For example, the upgrade process 112 may have a first reference execution time when the upgrade process 112 is executed on host 110 (as illustrated in FIG. 1) and a second different reference execution time when the upgrade process 112 is executed on host 120. In certain embodiments, different reference execution times may also be specified for the same upgrade process depending upon when the upgrade process is executed within the overall upgrade operation. For example, different reference execution times may be specified for the same upgrade process for different phases of the overall upgrade operation. In certain embodiments, the estimated reference execution time(s) for an upgrade processes in a given execution scheme may be provided to the hang monitor 140 as part of reference timing metadata 142.

As previously described, the reference timing metadata for an upgrade process may be comprise the reference execution time information for the upgrade process and, in some embodiments, the latency time information. The execution time information may be provided in one or more different formats. For example, the reference execution time information may be specified as a reference execution time length (i.e., an amount of time that the upgrade process is expected to complete execution, such as 30 minutes). The reference execution time information may also be specified as an expected time of execution completion (e.g., 2:30 pm EST on Jan. 1, 2014) determined based on an execution start time (e.g. 2:00 pm EST on Jan. 1, 2014) of the upgrade process.

As described above, in certain embodiments, the reference timing metadata specified for an upgrade process may comprise latency tolerance time information, which adds a time buffer to the reference execution time information for determining when the upgrade process is in the hang state. A latency tolerance time is used to avoid false positives in situations where an upgrade process may have exceeded its reference execution time not because it is in the hang state but due to host or network performance issues resulting in slower execution of the upgrade process. The latency tolerance time enables an additional time buffer to be added before the upgrade process is marked as in the hang state—that buffer may be sufficient for the upgrade process to finish execution and thereby avoid a false positive.

In certain embodiments, the latency information may be specified for each of the upgrade processes 112, 114, 122, 124, 132, 134. In such embodiments, an upgrade process may be deemed in the hang state if time of execution of the upgrade process is greater than (if the reference execution time is expressed as a length of time) or has exceeded (if the reference execution time is expressed as time of completion) the sum of the reference execution time and the reference reasonable latency tolerance time. For example, if a reference execution time of the upgrade process 112 is specified to be 30 minutes and the latency tolerance time for the upgrade process is specified to be 15 minutes, then at runtime, the upgrade process 112 is marked as in the hang state if the execution of process has past the 45 minutes threshold (i.e., 30+15). In one embodiment, the upgrade process may be marked as "overdue" (not in the hang state) beyond the 30 minutes mark.

As described above, in certain embodiments, the latency information may be individually specified for each upgrade process. In some embodiments, latency information may be specified for upgrade process for each of the different hosts (or types of hosts) that the upgrade process executes on, or for different upgrade phases. For example, the upgrade process 112 may have a first latency tolerance time specified for the upgrade process 112 for host 110 (as illustrated in FIG. 1) and a second latency tolerance time, which may be the same as or different from the first latency tolerance time, specified for the upgrade process 112 for host 120 (or some other different host). The latency tolerance time for the upgrade processes may be provided to the hang monitor 140 as part of the reference timing metadata 142.

As described above, the reference timing metadata including the reference execution time and the latency tolerance time for the upgrade processes 112, 114, 122, 124, 132, 134 may be provided to the hang monitor 140 as reference timing metadata 142. Alternatively, in certain embodiments, the reference execution time and/or the latency tolerance time for the upgrade processes 112, 114, 122, 124, 132, 134 may be determined dynamically on-the-fly (e.g., in real-time, during runtime). In certain embodiments, to facilitate dynamic runtime determination of the information, the hang monitor 140 may include (or may be associated with) a runtime context module 146 that is configured to gather runtime data for the upgrade processes 112, 114, 122, 124, 132, 134 from the hosts 110, 120, 130. The runtime context module 146 may then determine reference execution time (or an expected time of completion) and latency tolerance time for one or more of the upgrade processes 112, 114, 122, 124, 132, 134 based on the runtime data.

In some embodiments, the reference timing data cannot be accurately determined in advance. Thus, it may be necessary to determine the determine reference execution time (or an expected time of completion) and latency tolerance time for one or more of the upgrade processes based on the runtime data. For example, a language patch might contain 20 languages. When applying such a language patch, however, only languages that were installed and activated on the current application instance may need to be applied. Accordingly, the timing data would be significantly different between applying the patch to 1 language and applying the patch to 20 languages. For example, applying the patch to 1 language may have a projected execution time of 10 minutes while applying the patch to 20 languages may have a projected execution time of 20×10 minutes. The languages that are installed and activated can only be determined accurately by querying the database records on the designated hosts associated with each upgrade application instances at runtime. After the languages information on the current application instance is retrieved, embodiments may determine the projected execution time and the corresponding latency tolerance time for the given language patching task, and start to monitor its execution. One of ordinary skill in the art will appreciate that many other information, in addition to querying the database, may be collected and used to project the execution time of upgrade tasks at runtime including, but not limited to, investigating the contents of given patches, checking the current condition of application server and domain instances, analyzing the previous upgrade tasks conducted on the same designated hosts, and the like.

Accordingly, the reference execution time and the latency tolerance time information associated with the upgrade processes 112, 114, 122, 124, 132, 134 may be determined during runtime, i.e., while the upgrade processes 112, 114, 122, 124, 132, 134 are executing on the hosts 110, 120, 130. In certain embodiments, the runtime context module 146 and the reference timing metadata 142 may be used concurrently to determine the reference execution time and the latency tolerance time for the upgrade processes 112, 114, 122, 124, 132, 134. For example, the runtime context module 146 may determine the reference execution time and the latency tolerance time for some of the upgrade processes 112, 114, 122, 124, 132, 134 while the reference timing metadata 142 may be used to determine the reference execution time and the latency tolerance time for remaining of the upgrade processes 112, 114, 122, 124, 132, 134.

In certain embodiments, the upgrade processes 112, 114, 122, 124, 132, 134 may be categorized based on their reference execution time. The categories may be, for example, small, medium, large or extra-large. The latency tolerance time may also be customized for each category, and for an upgrade process categorized to a particular category, the latency tolerance time specified for that particular category may be automatically associated with that upgrade process. For example, in certain embodiments, any upgrade process whose reference execution time is less than 5 minutes may be categorized as a small and its associated latency tolerance time may be automatically set to be 5 minutes. Any upgrade process whose reference execution time is 5 minutes or greater and less than 60 minutes may be categorized as a medium and its associated latency tolerance time may be set to be 15 minutes. Any upgrade process whose reference execution time is 60 minutes or greater and less than 3 hours may be categorized as a large and its associated latency tolerance time set to be 30 minutes. If the reference execution time for an upgrade process is 3 hours or more, the upgrade process may be categorized as an extra-large and its associated latency tolerance time set to be 1 hour. One of ordinary skill in the art will appreciate that the categorization and the latency periods associated with categories described above are for illustration purposes only and should not be construed as limiting. The upgrade processes may be categorized in a different manner and different time limits may be set for latency tolerance times so long as the associated latency tolerance times allow for early detection of a hang during execution of the upgrade processes. In some embodiments, the upgrade processes may not be associated with a latency tolerance time or the latency tolerance time may be set to zero.

The hang monitor 140 may be configured to monitor the execution of the various upgrade processes on the various hosts. For each upgrade process on a host, the hand monitor 40 may keep track of when the upgrade process was started and/or the time length for which the upgrade process has been executing. The hang monitor 140 may also monitor the completion times of the upgrade processes. The hang monitor may store the runtime execution timing data gathered during runtime (e.g. when an upgrade process was started, the time length for which an upgrade process has been executing, the completion time of an upgrade process) as runtime timing metadata 143. Based upon the runtime execution timing data 143 captured as part of the monitoring and based upon the reference timing metadata 142, hang monitor 140 can determine whether one or more of the upgrade processes have entered a hang state.

Various different techniques may be used by the hang monitor 140 to receive or acquire the monitored information for the upgrade processes 112, 114, 122, 124, 132, 134 including but not limited to pull techniques, push techniques, checkpoint monitoring techniques, and others. In certain embodiments, a pull technique may be used wherein the hang monitor 140 may pull the runtime execution timing data associated with the upgrade processes 112, 114, 122, 124, 132, 134 from the hosts 110, 120, 130. For example, the hang monitor 140 may periodically communicate with the hosts 110, 120, 130 to retrieve runtime execution timing data for upgrade processes 112, 114, 122, 124, 132, 134 from the hosts, where the runtime execution timing data may include data for an upgrade process such as start time of the upgrade process, completion time, if any, for the upgrade process, the length of time that the upgrade process has been executing, and other related information.

In certain embodiments, a push technique may be used. In such embodiments, a host may be configured to periodically automatically push the runtime execution timing data for upgrade process executed by that host to the hang monitor 140. For example, if a push technique is being used by the host 110, the hosts 110 may periodically send to the hang monitor 140 runtime execution timing data for one or more upgrade processes executed by host 110 such as for upgrade processes 112 and 114. The runtime execution timing data may include data such as start time of the upgrade process, completion time, if any, for the upgrade process, the length of time that the upgrade process has been executing, and other related information.

In certain embodiments, a checkpoint monitoring technique may be used. According to this technique, the hosts 110, 120, 130 may write the runtime execution timing data for the upgrade processes to a centralized storage which is accessible to the hosts 110, 120, 130 as well as to the hang monitor 140. The hang monitor may periodically access the checkpoint data from the centralized storage to use it to determine whether any of the upgrade processes 112, 114, 122, 124, 132, 134 are in a hang state.

The hang monitor 140 uses the runtime execution timing data and the reference estimated time metadata information, which can include the reference execution time information and possibly the latency information, to identify upgrade processes that are in a hang state.

Referring back to FIG. 1, the hang monitor 140 may include a hang alert generator 144 for generating an alert message when one or more of the upgrade processes is determined to be in a hang state. The hang monitor 140 may send the alert message to the user or may write/save the alert message to a file, such as a log file. In this manner, the hang monitor 140 proactively and in an automated way identifies upgrade processes that are in a hang state to the user. Accordingly, unlike in the past, a system administrator no longer needs to manually search log files to determine if an upgrade process is hung. The hang alert generator 144 may generate an alert notification message with information such as information identifying the hung upgrade process, information identifying a host on which the upgrade process is hung.

In an embodiment where whether or not an upgrade process is in a hang state is determined based upon the reference execution time threshold specified for an upgrade process in the reference timing metadata definition, the upgrade infrastructure 100 or hang monitor 140 may automatically start a thread to monitor and watch the execution of the upgrade process and generate an alert if the upgrade process is overdue and/or hang. For example, <plugin name="StopAll Servers" estimated.time="1800"/> may indicate the StopAll Servers add-on upgrade process is expected to complete within 30 minutes (i.e., 1800 seconds). A hang alert message may be generated by the thread if the add-on upgrade process is still active after 30 minutes. In an embodiment where execution time plus a latency period is used to determine whether an upgrade process is in the hang state, then the thread may generate an alert soon after the expected execution time plus latency period has passed.

In some embodiments, the alert message generated by the hang alert generator 144 may output to a user and ask the user how to proceed. The alert may provide multiple options to the user for selecting an action to be taken. For example, the alert message may include an option to terminate (e.g., kill the execution of) the hung upgrade process, to restart the hung upgrade process, to terminate or restart the entire upgrade operation, to continue waiting, etc. The user's selection of one of these options may be provided as an input to the hang monitor 140 and actions taken per the selection.

Embodiments implementing metadata-driven hang detection discussed herein significantly reduce the development effort by individual developers compared to conventional implementations where no reference timing metadata is used. In certain embodiments, the reference execution time defined in the reference timing metadata associated with upgrade processes can be changed in seconds without the need to modify the upgrade process code. As described above, the same upgrade process executing in different phases of the overall upgrade operation or executing on different hosts can have different associated hang thresholds (e.g., different reference execution times and/or different latency periods). The thresholds may be defined and/or modified in the metadata without requiring the developers to write additional code to identify the context of the hang within the overall upgrade operation.

Figure 2:
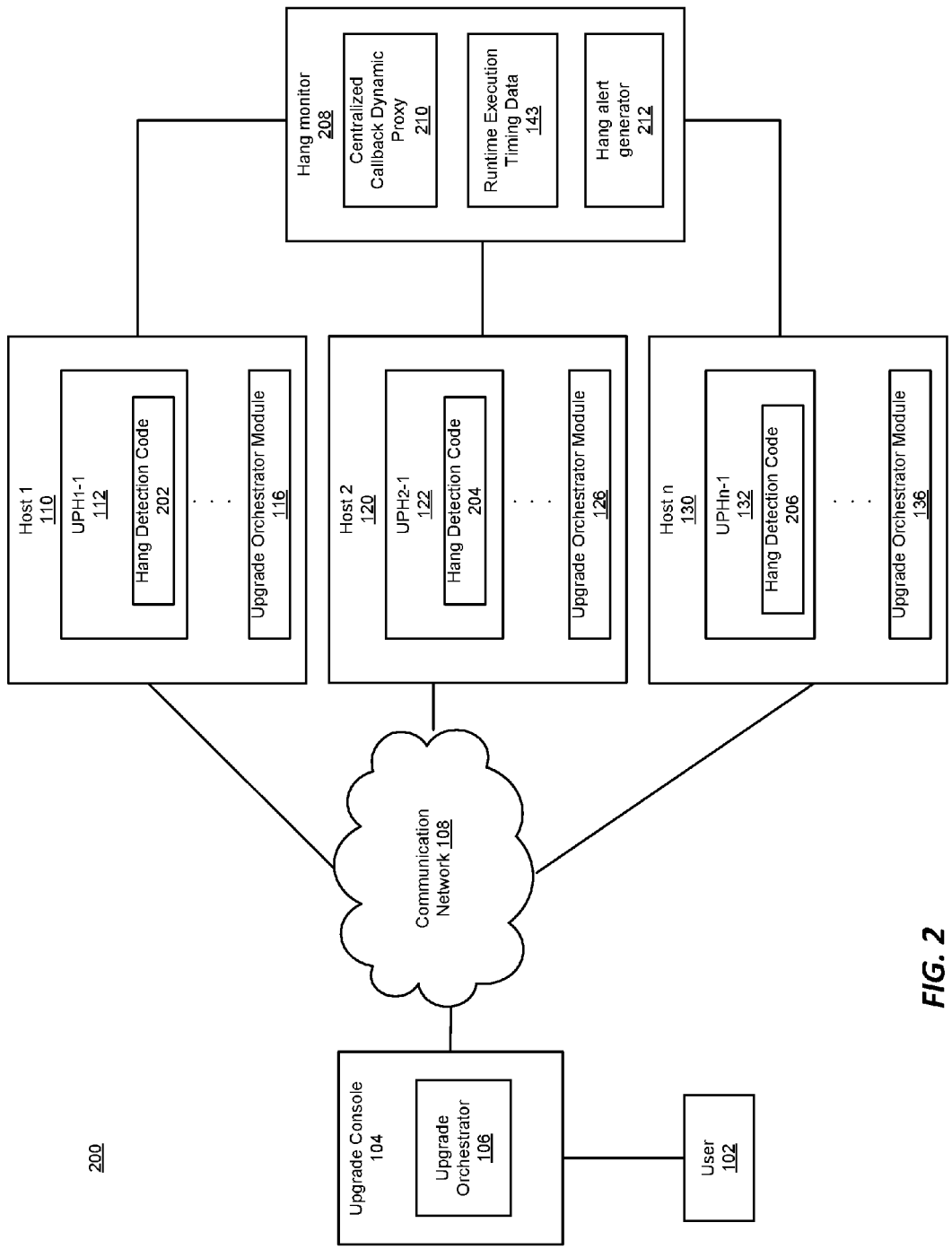
FIG. 2 depicts an upgrade infrastructure for executing multiple upgrade processes on multiple hosts using code-driven automatic hang detection according to an embodiment of the present invention.

Referring now to FIG. 2, an exemplary upgrade infrastructure (e.g. upgrade system) 200 using code-driven automatic hang detection is illustrated according to various embodiments. FIG. 2 includes elements similar to FIG. 1. The reference numerals for these elements are kept the same and a discussion of these elements is provided above. Accordingly, the discussion of these similar elements is omitted below with respect to FIG. 2.

As illustrated in FIG. 2, upgrade process 112 may execute on host 110, upgrade process 122 may execute on host 120 and upgrade process 132 may execute on host 130. The upgrade infrastructure 200 also includes a hang monitor 208. The hang monitor 208 may be in communication with the hosts 110, 120, 130 to monitor the execution of the upgrade processes 112, 122, 132. The hang monitor 208 may be able to perform code-driven hang detection.

In an embodiment in which hang detection is code-driven, each upgrade process 112, 122 and 132 may include a dedicated hang detection code 202, 204, 206 embedded in the code for upgrade processes 112, 122, 132. For example, the hang detection codes 202, 204, 206 may be injected in the code for upgrade processes 112, 122, 132 by a centralized callback dynamic proxy 210 associated with the hang monitor 208. The hang detection codes 202, 204, 206 when executed are configured to detect whether the corresponding upgrade processes 112, 122, 132 have entered into a hang state during execution.

In certain embodiments, the hang detection code for a particular upgrade process may determine if the upgrade process is to be indicated as being in the hang state based upon reference execution time (and additionally latency period in certain embodiments) specified for the particular upgrade process. This timing information may be specified as timing metadata or it may be specified in the code itself. That is, the timing information such as the projected execution time may be found in either the predefined timing metadata or the code logic. The code logic may be used to determine the projected execution time based on the collected runtime information. Embodiments may allow to replace any predefined timing data with the data calculated at the runtime. For example, hang detection codes 202, 204, 206 may have access to reference execution times of various steps or tasks of the upgrade processes 112, 122, 132. Accordingly, the hang detection codes 202, 204, 206 may compare a current execution time of each of the steps or tasks for the upgrade processes 112, 122, 132 to an reference execution times of the steps or tasks for the upgrade processes 112, 122, 132. A hang detection code for an upgrade process may determine that the upgrade processes is to be indicated as being in the hang state if the time of execution of a step or task of the upgrade process is greater than the reference execution time for that step or task (or in certain embodiments greater than reference execution time for that step or task plus a reasonable latency tolerance time).

Alternatively, the hang detection codes 202, 204, 206 may monitor execution of the upgrade processes 112, 122, 132 to determine whether the upgrade processes 112, 122, 132 generate data during execution. The hang detection codes 202, 204, 206 may determine that one or more of the upgrade processes 112, 122, 132 is to be indicated as being in the hang state if the upgrade process ceases generating new data.

When a hang detection code detects that its corresponding upgrade process has transitioned into a hang state, the code may use a callback API to report the detected hang state to a centralized callback dynamic proxy 210, which is part of hang monitor 208. A hang alert generator 212 in communication with the centralized callback dynamic proxy 210 may generate a hang alert message and send the generated hang alert message to a user such as a system administrator. If the upgrade process continues and completes execution at a later point in time before the system administrator takes action, the centralized callback dynamic proxy 210 may automatically send an update message to the system administrator indicating that the hang is resolved and that the execution of the upgrade process is resumed and/or completed or in general provide an indication that the upgrade process is no longer in a hang state.

Figure 3:
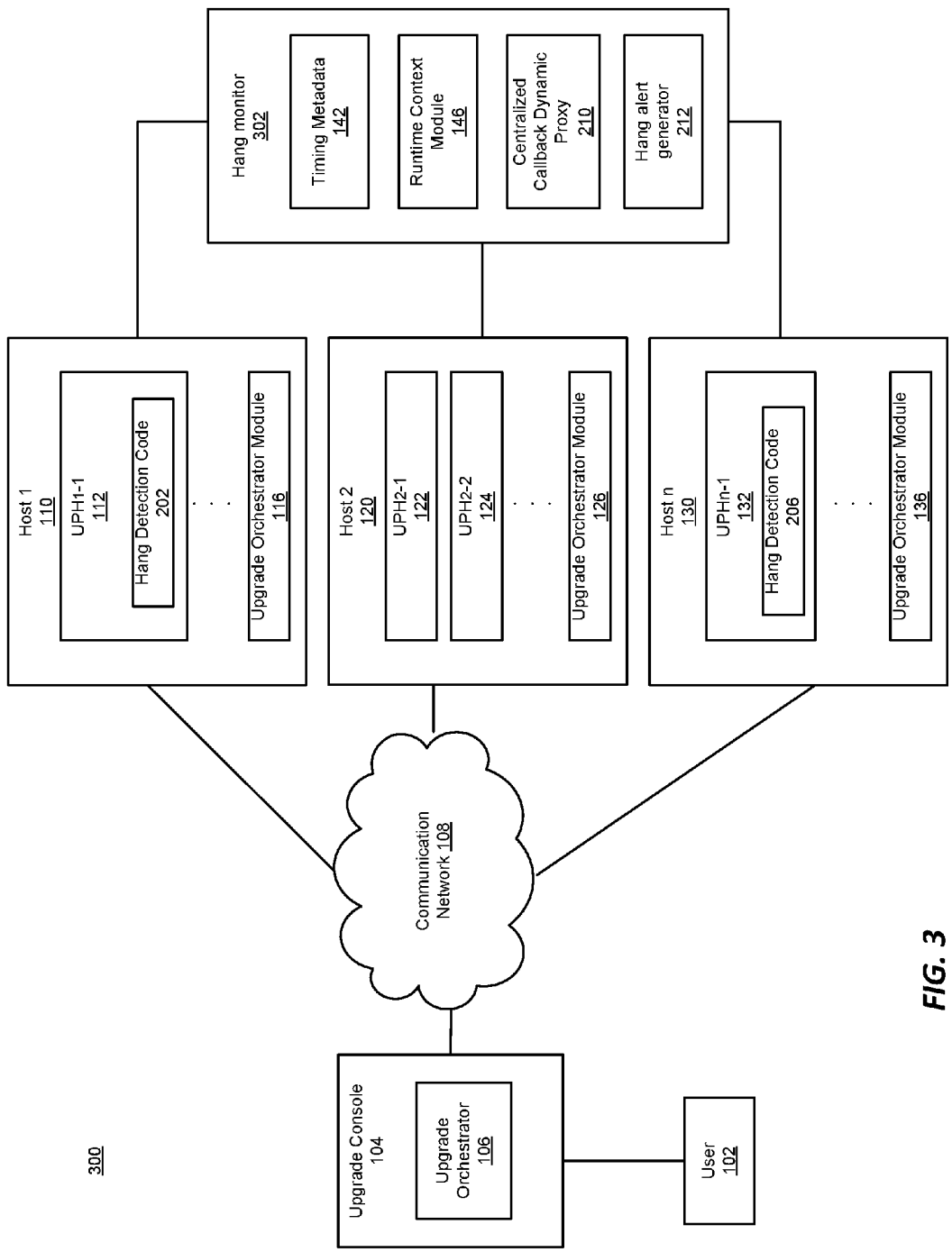
FIG. 3 depicts an upgrade infrastructure for executing multiple upgrade processes on multiple hosts using both metada-driven and code-driven automatic hang detection according to an embodiment of the present invention.

In certain embodiments, an exemplary upgrade infrastructure (e.g. upgrade system) may use a combination of the code-driven automatic hang detection and metadata-driven hang detection techniques described above. FIG. 3 illustrates such an exemplary embodiment. In FIG. 3, an exemplary upgrade infrastructure (e.g. upgrade system) 300 is shown that uses both metadata-driven and code-driven automatic hang detection techniques according to various embodiments. Some of the elements depicted in FIG. 3 are similar to the elements depicted in FIG. 1 and FIG. 2, and the same reference numerals are used for these elements. Since these elements have already been describe above, the description for some of these elements is omitted below with respect to FIG. 3.

As illustrated in FIG. 3, upgrade process 112 may execute on host 110, upgrade process 122 may execute on host 120 and upgrade process 132 may execute on host 130. The upgrade infrastructure 300 also includes a hang monitor 302. The hang monitor 302 may be in communication with the hosts 110, 120, 130 to monitor the execution of the upgrade processes 112, 122, 132. The hang monitor 302 may be able to perform both metadata-driven hang detection and code-driven hang detection.

In connection with code-driven hang detection technique, one or more of the upgrade processes illustrated in FIG. 3, e.g. the upgrade process 112, may include a dedicated hang detection code 202 embedded in the upgrade process 112. For example, the hang detection code 202 may be injected in the upgrade process 112 by a centralized callback dynamic proxy 210 associated with the hang monitor 302. The hang detection code 202 executes to detect whether the corresponding upgrade process 112 enters into a hang state during execution. In certain embodiments, the hang detection code 202 may have access to reference execution times of various steps or tasks of the upgrade process 112. Accordingly, the hang detection code 202 may compare a current execution time of each of the steps or tasks for the upgrade process 112 to an reference execution times of the steps or tasks for the upgrade process 112. The hang detection code 202 may determine that the upgrade process 112 is to be indicated as being in the hang state if time of execution of a step or task of the upgrade process is greater than ((reference execution time of the step or task)+(reasonable latency tolerance time)). Alternatively, the hang detection code 202 may monitor execution of the upgrade process 112 to determine whether the upgrade process 112 generate data during execution. The hang detection code 202 may determine that the upgrade process 112 is to be indicated as being in the hang state if the upgrade process ceases generating new data.

In connection with metadata-driven hang detection technique, an reference execution time (or an expected time of completion) for one or more upgrade processes illustrated in FIG. 3, such as upgrade processes 122, 124 may be provided to the hang monitor 302 in form of reference timing metadata 142. In some embodiments, the reference timing metadata 142 may be stored at a storage location accessible by the hang monitor 302. The reference execution time for the upgrade processes 122, 124 in a given execution scheme is provided to the hang monitor 302 as reference timing metadata 142. In certain embodiments, a latency tolerance time (i.e. the time between identifying an upgrade process as overdue and in a hang state) may be defined for the upgrade processes 122, 124. The upgrade process may be deemed in hang state if time of execution of the upgrade process is greater than ((reference execution time)+(reasonable latency tolerance time)). The hang monitor 302 may include (or may be associated with) a runtime context module 146 that gathers runtime data for the upgrade processes 122, 124 from the host 120. The runtime context module 146 may determine reference execution time (or an expected time of completion) and latency tolerance time for one or more of the upgrade processes 122, 124 based on the runtime data. As provided above, the hang monitor 302 may monitor the execution times of the upgrade processes to determine whether one or more of the upgrade processes entered a hang state. The hang monitor 302 may monitor the execution times of the upgrade processes 122, 124 using one or more of the pull technique, push technique or the checkpoint monitoring technique, which are all defined above. Upon receiving or retrieving the runtime execution timing data for the upgrade processes 122, 124, the hang monitor 302 may compare the runtime execution timing data to the reference execution time (or an expected time of completion) and, if applicable, the latency tolerance time for upgrade processes 122, 124 to determine whether one or more of the upgrade processes 122, 124 is to be indicated as being in the hang state.

FIG. 4 illustrates a simplified flowchart 400 depicting processing performed by a hang monitor provided in an upgrade infrastructure executing multiple upgrade processes on multiple hosts according to an embodiment of the present invention. The processing depicted in FIG. 4 may be implemented in software (e.g., code, instructions, program) executed by one or more processing units (e.g., processors cores), hardware, or combinations thereof. The software may be stored in memory (e.g., on a memory device, on a non-transitory computer-readable storage medium). The particular series of processing steps depicted in FIG. 4 is not intended to be limiting. In one embodiment, the processing depicted in FIG. 4 is performed by one or more components of the upgrade infrastructure 100 depicted in FIG. 1. In another embodiment, the processing depicted in FIG. 4 is performed by one or more components of the upgrade infrastructure 200 depicted in FIG. 2. In yet another embodiment, the processing depicted in FIG. 4 is performed by one or more components of the upgrade infrastructure 300 depicted in FIG. 3.

In certain embodiments, the processing in flowchart 400 may be performed by a hang monitor. While the processing in FIG. 4 is for processing related to one upgrade process executing on a host, the processing can be applied to multiple upgrade processes executing as part of the overall upgrade operation on multiple hosts. At 402, the hang monitor may monitor execution of a first upgrade process on a first host machine, the first upgrade process upgrading a first software application on the first host machine. According to certain embodiments, the hang monitor may be provided as code within the first upgrade process. Alternatively, the hang monitor may be a separate entity in the upgrade infrastructure that is in communication with the first host machine for monitoring execution of the first upgrade process. According to various embodiments, the hang monitor may monitor execution of a second upgrade process on a second host machine, the second upgrade process upgrading a second software application on the second host machine.

At 404, the hang monitor may access runtime execution timing data for the first upgrade process based on the monitoring. For example, the hang monitor may receive the runtime execution timing data from the first upgrade process. For example, the first upgrade process may automatically push the runtime execution timing data associated with the first upgrade process to the hang monitor. In certain embodiments, the hang monitor may retrieve (e.g. pull) the runtime execution timing data from the first upgrade process executing on the first host. Alternatively, the first upgrade process may write the runtime execution timing data to a storage as checkpoint data. The hang monitor may access the storage to retrieve (e.g. read) the runtime execution timing data from the storage. The hang monitor may read the checkpoint data, and analyze the checkpoint data to determine the runtime execution timing data associated with the first upgrade.

At 406, the hang monitor may compare the runtime execution timing data associated with the first upgrade process to a first reference timing data specified for the first upgrade process for the first host machine. The first reference timing data is different from a second reference timing data specified for the first upgrade process for a second host machine different from the first host machine. The first reference timing data associated with the first upgrade process may include an reference execution time specified for the first upgrade process and possibly also a first latency tolerance time associated with the first upgrade process. The reference execution time of the first upgrade process and the first latency tolerance time may be specific to the first host machine (e.g., the reference timing data may be different for the same first upgrade process for a different host). The first reference timing data associated with the first upgrade process may be provided to the hang monitor in form of metadata. In certain embodiments, the hang monitor may determine the first reference timing data for the first upgrade process based on the runtime execution timing data associated with the first upgrade process. For example, based on the runtime execution timing data of the first upgrade process, the hang monitor may determine an estimated execution time or expected time of completion for the first upgrade process. The estimated execution time or the expected time of completion may serve as the first reference timing data for the first upgrade process.

At 408, the hang monitor may determine, based upon the comparing, that the first upgrade process is to be indicated as being in a hang state. In embodiments where only the reference execution time information is specified and not any latency period, the hang monitor may determine that the first upgrade process is to be indicated as being in the hang state if the first upgrade process continues execution after the first reference execution time has passed. For example, if the reference execution time information is specified as a length of execution, the first upgrade process may be determined to be in a hang state if the runtime length of execution of the first upgrade process has exceeded the specified length of execution for the first upgrade process for the first host. As another example, if the reference execution time information is specified as a time of completion, the first upgrade process may be determined to be in a hang state if the time when the execution of the first upgrade process was checked is past the specified completion time specified for the first upgrade process for the first host.

In some embodiments, the reference timing information for the first upgrade process may comprise both an expected execution time and also a latency period. In such an embodiment, hang monitor may determine that the first upgrade process is to be indicated as being in the hang state if the first upgrade process continues execution beyond a total of the first reference execution time and the first latency tolerance time.

At 410, upon determining that the first upgrade process is to be indicated as being in the hang state, the hang monitor may generate a hang alert message. The hang monitor may send the hang alert message to a user, such as a system administrator and/or write (e.g. store) the hang alert message in a file, such as a log file.

In certain embodiments, the hang monitor may continue monitoring execution of the first upgrade process. If, at a later time, the hang monitor determines that the first upgrade process has resumed normal execution, the hang monitor may generate an update message indicating that the first upgrade process is no longer in a hang state. The update message may be sent to a user, such as a system administrator, or may be written to a file such as log file.

In certain embodiments, the message sent to a user may also provide multiple options to the user. For example, the alert message may include an option to terminate (e.g., kill the execution of) the first upgrade process, to restart the hung first upgrade process, to terminate or restart the entire upgrade operation, to continue waiting, etc. An action (or no action) may then be taken based upon the user-selected option.

Figure 5:
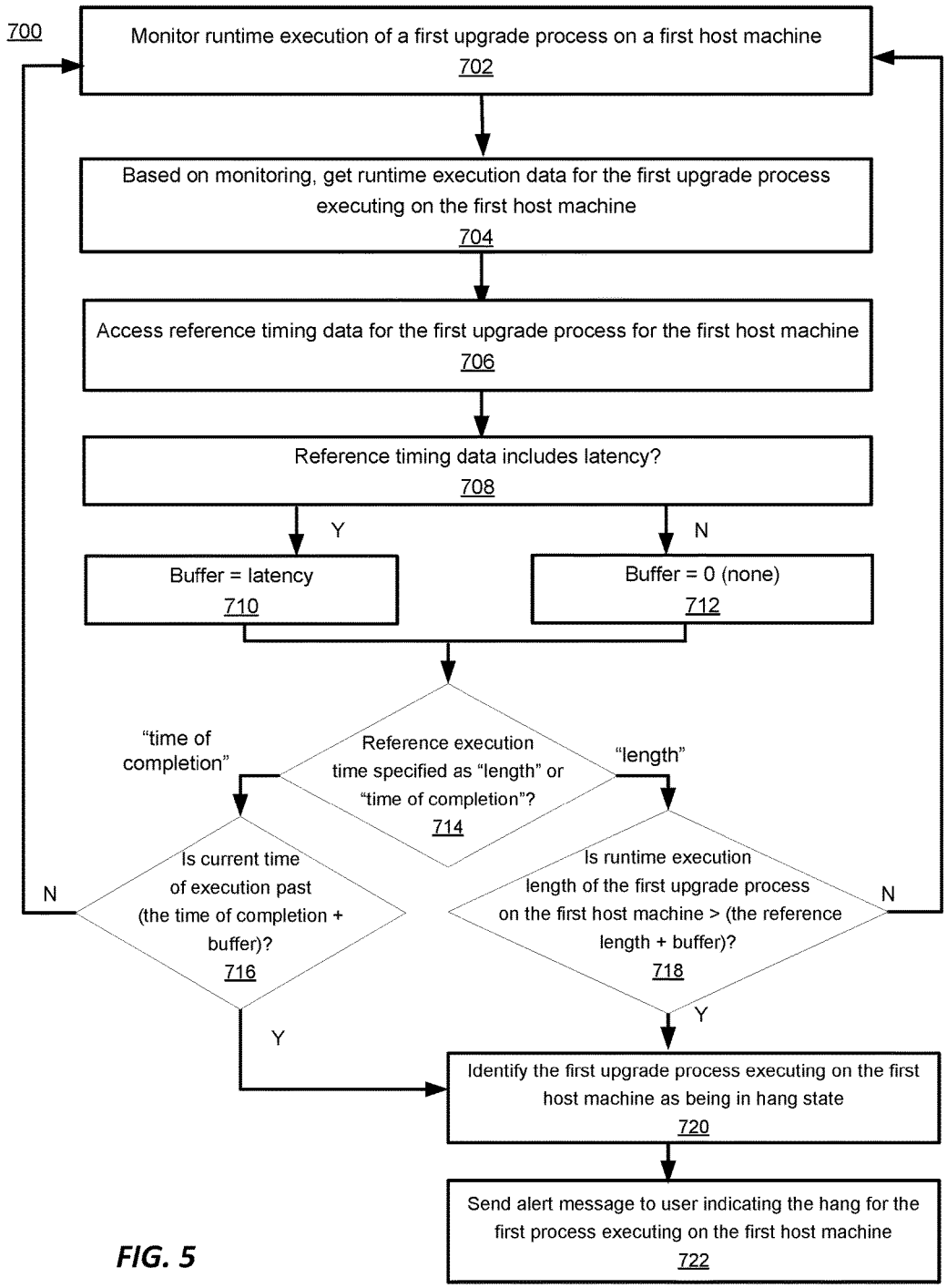
FIG. 5 shows a method performed by a hang monitor monitoring a first upgrade process executing on a first host machine according to an embodiment of the present invention.

FIG. 5 shows a method performed by a hang monitor monitoring a first upgrade process executing on a first host machine according to an embodiment of the present invention. The processing depicted in FIG. 5 may be implemented in software (e.g., code, instructions, program) executed by one or more processing units (e.g., processors cores), hardware, or combinations thereof. The software may be stored in memory (e.g., on a memory device, on a non-transitory computer-readable storage medium). The particular series of processing steps depicted in FIG. 5 is not intended to be limiting. In one embodiment, the processing depicted in FIG. 5 is performed by one or more components of the upgrade infrastructure 100 depicted in FIG. 1. In another embodiment, the processing depicted in FIG. 5 is performed by one or more components of the upgrade infrastructure 200 depicted in FIG. 2. In yet another embodiment, the processing depicted in FIG. 5 is performed by one or more components of the upgrade infrastructure 300 depicted in FIG. 3.

In certain embodiments, the processing in flowchart 700 may be performed by a hang monitor. While the processing in FIG. 5 is for processing related to one upgrade process executing on a host, the processing can be applied to multiple upgrade processes executing as part of the overall upgrade operation on multiple hosts. At 702, the hang monitor may monitor execution of a first upgrade process on a first host machine, the first upgrade process upgrading a first software application on the first host machine. According to certain embodiments, the hang monitor may be provided as code within the first upgrade process. Alternatively, the hang monitor may be a separate entity in the upgrade infrastructure that is in communication with the first host machine for monitoring execution of the first upgrade process. According to various embodiments, the hang monitor may monitor execution of a second upgrade process on a second host machine, the second upgrade process upgrading a second software application on the second host machine.

At 704, the hang monitor may get runtime execution timing data for the first upgrade process executing on the first host machine based on the monitoring. For example, the hang monitor may receive the runtime execution timing data from the first upgrade process. For example, the first upgrade process may automatically push the runtime execution timing data associated with the first upgrade process to the hang monitor. In certain embodiments, the hang monitor may retrieve (e.g. pull) the runtime execution timing data from the first upgrade process executing on the first host. Alternatively, the first upgrade process may write the runtime execution timing data to a storage as checkpoint data. The hang monitor may access the storage to retrieve (e.g. read) the runtime execution timing data from the storage. The hang monitor may read the checkpoint data, and analyze the checkpoint data to determine the runtime execution timing data associated with the first upgrade.

At 706, the hang monitor may access reference timing data associated with the first upgrade process for the first host machine. The reference timing data associated with the first upgrade process may include an reference execution time specified for the first upgrade process. The reference execution time of the first upgrade process may be specific to the first host machine (e.g., the reference timing data may be different for the same first upgrade process for a different host). The reference timing data associated with the first upgrade process may be provided to the hang monitor in form of metadata. In certain embodiments, the hang monitor may determine the reference timing data for the first upgrade process based on the runtime execution timing data associated with the first upgrade process. For example, based on the runtime execution timing data of the first upgrade process, the hang monitor may determine an estimated execution time or expected time of completion for the first upgrade process. The estimated execution time or the expected time of completion may serve as the reference timing data for the first upgrade process.

At 708, the hang monitor may determine whether the reference timing data associated with the first upgrade process for the first host machine includes a latency tolerance time associated with the first upgrade process. If the reference timing data includes a latency tolerance time (YES to 708), then the hang monitor sets the buffer equal to the latency tolerance time at 710. On the other hand, if the reference timing data does not include a latency tolerance time (NO to 708), then the hang monitor sets the buffer equal to zero (i.e. no buffer) at 712.

At 714, the hang monitor determines whether the reference execution time is specified as a "length" or a "time of completion". As provided above, the reference execution time may be specified as a length, e.g. 30 minutes. This may imply that the first upgrade process is expected to complete execution 30 minutes after starting execution. Alternatively, the reference execution time may be specified as a time of completion, e.g. 2:00 pm EST on Jan. 1, 2014. This may imply that the first upgrade process is expected to complete execution at 2:00 pm EST on Jan. 1, 2014.

If the reference execution time is specified as a time of completion, the hang monitor determines, based upon the data received in 704, whether the current time of execution past the time of completion plus the buffer (step 716). If, the current time of execution past the time of completion plus the buffer, the method returns to step 702.

If the reference execution time is specified as a length, the hang monitor determines, based upon the data received in 704, whether the runtime execution length of the first upgrade process on the first host machine is greater than the reference length determined in 706 plus the buffer (step 718). At 720, if the runtime execution length of the first upgrade process on the first host machine is greater than the reference length determined in 706 plus the buffer, the hang monitor identifies the first upgrade state as being in a hang state.

At 722, upon determining that the first upgrade process is to be identified as being in a hang state, the hang monitor may generate a hang alert message indicating that the first upgrade process in hang on the first host machine. The hang monitor may send the hang alert message to a user, such as a system administrator and/or write (e.g. store) the hang alert message in a file, such as a log file.

Embodiments of the present invention enable the automated detection of a hang of an upgrade process shortly and very close to after the hang occurs in a heterogeneous computing environment comprising multiple hosts with different capabilities and each host executing one or more upgrade processes. Due to the quick detection of upgrade processes that have entered into a hang state, corrective actions can be taken in a timely manner. This significantly reduces the time taken for the overall upgrade operation. A user no longer has to spend a lot of time in manually identifying when an upgrade process is in a hang state—a task that becomes almost impossible in a heterogeneous environment comprising multiple hosts and executing a high number (e.g., tens, hundreds, thousands) of upgrade processes as part of the overall upgrade operation.

The upgrade infrastructure described herein is also flexible enough to be customized for different processes and different hosts. For example, as described above, the same upgrade process may have different associated reference timing information for different hosts. This customization not only improves the quick identification of hung processes but also reduces the risk of identifying false positives, where a normally executing upgrade process is inadvertently identified as being in the hang state. In certain embodiments, the chance of identifying false positives is further reduced by specifying latency periods for an upgrade process in addition to the reference execution time specified for the upgrade process. The specified latency periods can also be customized for an upgrade process on a per host basis.

Figure 6:
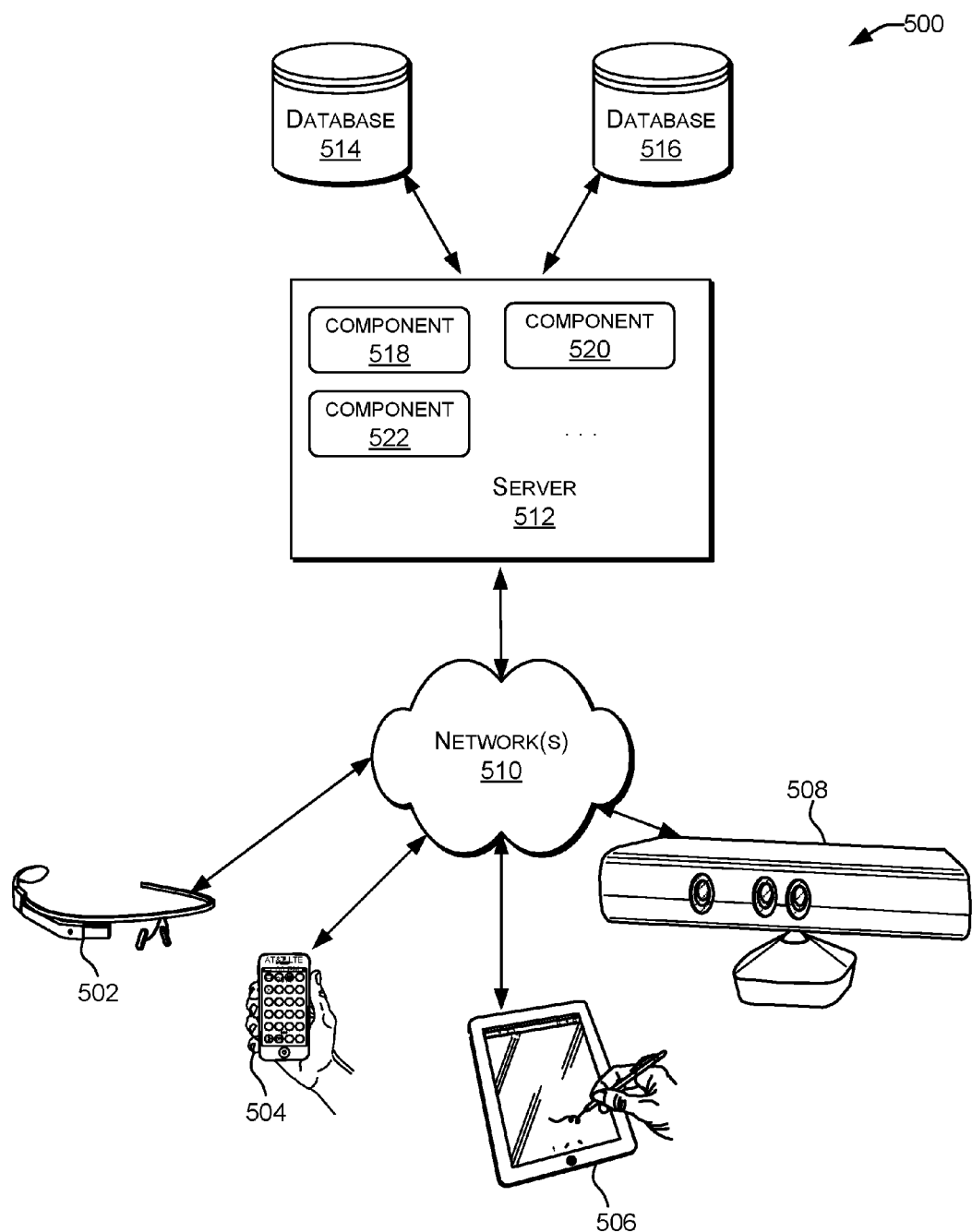
FIG. 6 depicts a simplified diagram of a distributed system for implementing one of the embodiments.

FIG. 6 depicts a simplified diagram of a distributed system 500 for implementing one of the embodiments. In the illustrated embodiment, distributed system 500 includes one or more client computing devices 502, 504, 506, and 508, which are configured to execute and operate a client application such as a web browser, proprietary client (e.g., Oracle Forms), or the like over one or more network(s) 510. Server 512 may be communicatively coupled with remote client computing devices 502, 504, 506, and 508 via network 510.

In various embodiments, server 512 may be adapted to run one or more services or software applications provided by one or more of the components of the system. In some embodiments, these services may be offered as web-based or cloud services or under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in the figure, the software components 518, 520 and 522 of system 500 are shown as being implemented on server 512. In other embodiments, one or more of the components of system 500 and/or the services provided by these components may also be implemented by one or more of the client computing devices 502, 504, 506, and/or 508. Users operating the client computing devices may then utilize one or more client applications to use the services provided by these components. These components may be implemented in hardware, firmware, software, or combinations thereof. It should be appreciated that various different system configurations are possible, which may be different from distributed system 500. The embodiment shown in the figure is thus one example of a distributed system for implementing an embodiment system and is not intended to be limiting.

Client computing devices 502, 504, 506, and/or 508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 502, 504, 506, and 508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 510.

Although exemplary distributed system 500 is shown with four client computing devices, any number of client computing devices may be supported. Other devices, such as devices with sensors, etc., may interact with server 512.

Network(s) 510 in distributed system 500 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 510 can be a local area network (LAN), such as one based on Ethernet, Token-Ring and/or the like. Network(s) 510 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 512 may be adapted to run one or more services or software applications described in the foregoing disclosure. For example, server 512 may correspond to a server for performing processing described above according to an embodiment of the present disclosure.

Server 512 may run an operating system including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more databases 514 and 516. Databases 514 and 516 may reside in a variety of locations. By way of example, one or more of databases 514 and 516 may reside on a non-transitory storage medium local to (and/or resident in) server 512. Alternatively, databases 514 and 516 may be remote from server 512 and in communication with server 512 via a network-based or dedicated connection. In one set of embodiments, databases 514 and 516 may reside in a storage-area network (SAN). Similarly, any necessary files for performing the functions attributed to server 512 may be stored locally on server 512 and/or remotely, as appropriate. In one set of embodiments, databases 514 and 516 may include relational databases, such as databases provided by Oracle, that are adapted to store, update, and retrieve data in response to SQL-formatted commands.

Figure 7:
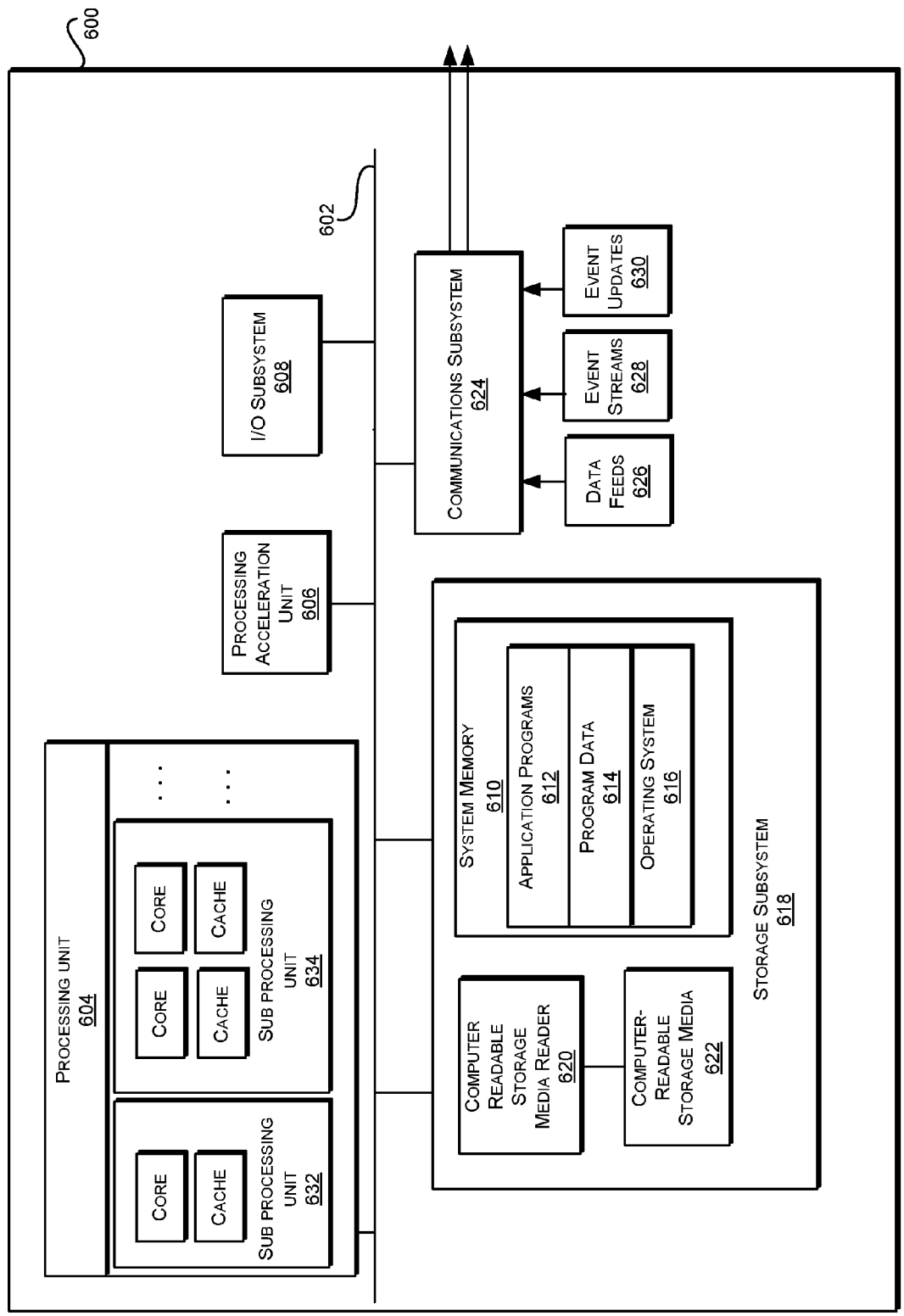
FIG. 7 illustrates an exemplary computer system, in which various embodiments of the present invention may be implemented.

FIG. 7 illustrates an exemplary computer system 600, in which various embodiments of the present invention may be implemented. The system 600 may be used to implement any of the computer systems described above. As shown in the figure, computer system 600 includes a processing unit 604 that communicates with a number of peripheral subsystems via a bus subsystem 602. These peripheral subsystems may include a processing acceleration unit 606, an I/O subsystem 608, a storage subsystem 618 and a communications subsystem 624. Storage subsystem 618 includes tangible computer-readable storage media 622 and a system memory 610.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 604, which can be implemented as one or more integrated circuits (e.g., a conventional microprocessor or microcontroller), controls the operation of computer system 600. One or more processors may be included in processing unit 604. These processors may include single core or multicore processors. In certain embodiments, processing unit 604 may be implemented as one or more independent processing units 632 and/or 634 with single or multicore processors included in each processing unit. In other embodiments, processing unit 604 may also be implemented as a quad-core processing unit formed by integrating two dual-core processors into a single chip.

In various embodiments, processing unit 604 can execute a variety of programs in response to program code and can maintain multiple concurrently executing programs or processes. At any given time, some or all of the program code to be executed can be resident in processor(s) 604 and/or in storage subsystem 618. Through suitable programming, processor(s) 604 can provide various functionalities described above. Computer system 600 may additionally include a processing acceleration unit 606, which can include a digital signal processor (DSP), a special-purpose processor, and/or the like.

I/O subsystem 608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 600 may comprise a storage subsystem 618 that comprises software elements, shown as being currently located within a system memory 610. System memory 610 may store program instructions that are loadable and executable on processing unit 604, as well as data generated during the execution of these programs.

Depending on the configuration and type of computer system 600, system memory 610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 604. In some implementations, system memory 610 may include multiple different types of memory, such as static random access memory (SRAM) or dynamic random access memory (DRAM). In some implementations, a basic input/output system (BIOS), containing the basic routines that help to transfer information between elements within computer system 600, such as during start-up, may typically be stored in the ROM. By way of example, and not limitation, system memory 610 also illustrates application programs 612, which may include client applications, Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 618 may also provide a tangible computer-readable storage medium for storing the basic programming and data constructs that provide the functionality of some embodiments. Software (programs, code modules, instructions) that when executed by a processor provide the functionality described above may be stored in storage subsystem 618. These software modules or instructions may be executed by processing unit 604. Storage subsystem 618 may also provide a repository for storing data used in accordance with the present invention.

Storage subsystem 600 may also include a computer-readable storage media reader 620 that can further be connected to computer-readable storage media 622. Together and, optionally, in combination with system memory 610, computer-readable storage media 622 may comprehensively represent remote, local, fixed, and/or removable storage devices plus storage media for temporarily and/or more permanently containing, storing, transmitting, and retrieving computer-readable information.

Computer-readable storage media 622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 600.

By way of example, computer-readable storage media 622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to connect to one or more devices via the Internet. In some embodiments communications subsystem 624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 624 can provide wired network connectivity (e.g., Ethernet) in addition to or instead of a wireless interface.

In some embodiments, communications subsystem 624 may also receive input communication in the form of structured and/or unstructured data feeds 626, event streams 628, event updates 630, and the like on behalf of one or more users who may use computer system 600.

By way of example, communications subsystem 624 may be configured to receive data feeds 626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 624 may also be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 624 may also be configured to output the structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   monitoring execution of an upgrade process on a host machine, the upgrade process upgrading a software application on the host machine, the upgrade process including a plurality of tasks, the plurality of tasks including at least a first task and a second task;
   determining, based upon the monitoring, a time of execution for the first task, wherein the time of execution for the first task is different from a time of execution for the second task;
   determining a reference execution time specified for the first task, wherein the reference execution time specified for the first task is different from a reference execution time specified for the second task;
   determining a latency tolerance time specified for the first task;
   determining, based on the time of execution for the first task and the latency tolerance time specified for the first task, that the first task has not completed execution for a period of time that is greater than a total of the reference execution time and the latency tolerance time;
   upon determining that the first task has not completed execution for a period of time that is greater than a total of the reference execution time and the latency tolerance time, determining that the upgrade process on the host machine is to be indicated as being in a hang state; and
   generating an alert message indicating the upgrade process executing on the host machine is in the hang state.

2. The method of claim 1, wherein the upgrade process is associated with an upgrade reference execution time and an upgrade latency tolerance time for the upgrade process.

3. The method of claim 2, wherein generating the alert message is done before a total of the upgrade reference execution time and the upgrade latency tolerance time for the upgrade process.

4. The method of claim 2, wherein the upgrade reference execution time for the upgrade process is different for different host machines.

5. The method of claim 1, wherein the reference execution time for the first task is different for different host machines.

6. The method of claim 1, wherein the monitoring comprises monitoring the execution of the first task.

7. A system comprising:
   one or more processors; and
   a non-transitory computer-readable medium including instructions that, when executed by the one or more processors, cause the one or more processors to:
   monitor execution of an upgrade process on a host machine, the upgrade process upgrading a software application on the host machine, the upgrade process including a plurality of tasks, the plurality of tasks including at least a first task and a second task;
   determine, based upon the monitoring, a time of execution for the first task, wherein the time of execution for the first task is different from a time of execution for the second task;
   determine a reference execution time specified for the first task, wherein the reference execution time specified for the first task is different a reference execution time specified for the second task;
   determine a latency tolerance time specified for the first task;
   determine, based on the time of execution for the first task and the latency tolerance time specified for the first task, that the first task has not completed execution for a period of time that is greater than a total of the reference execution time and the latency tolerance time; and
   upon determining that the first task has not completed execution for a period of time that is greater than a total of the reference execution time and the latency tolerance time, determining that the upgrade process on the host machine is to be indicated as being in a hang state, and generate an alert message indicating the upgrade process executing on the host machine is in the hang state.

8. The system of claim 7, wherein the upgrade process is associated with an upgrade reference execution time and an upgrade latency tolerance time for the upgrade process.

9. The system of claim 8, wherein generating the alert message is done before a total of the upgrade reference execution time and the upgrade latency tolerance time for the upgrade process.

10. The system of claim 7, wherein the reference execution time for the first task is different for different host machines.

11. The system of claim 7, wherein the monitoring comprises monitoring the execution of the first task.

12. A non-transitory computer-readable storage medium storing a plurality of instructions executable by one or more processors, the plurality of instructions when executed by the one or more processors cause the one or more processors to perform processing comprising:
   monitoring execution of an upgrade process on a host machine, the upgrade process upgrading a software application on the host machine, the upgrade process including a plurality of tasks, the plurality of tasks including at least a first task and a second task;

determining, based upon the monitoring, a time of execution for the first task, wherein the time of execution for the first task is different from a time of execution for the second task;

determining a reference execution time specified for the first task, wherein the reference execution time specified for the first task is different a reference execution time specified for the second task;

determining a latency tolerance time specified for the first task;

determining, based on the time of execution for the first task and the latency tolerance time specified for the first task, that the first task has not completed execution for a period of time that is greater than a total of the reference execution time and the latency tolerance time;

upon determining that the first task has not completed execution for a period of time that is greater than a total of the reference execution time and the latency tolerance time, determining that the upgrade process on the host machine is to be indicated as being in a hang state; and generating an alert message indicating the upgrade process executing on the host machine is in the hang state.

13. The non-transitory computer-readable storage medium of claim 12, wherein the upgrade process is associated with an upgrade reference execution time and an upgrade latency tolerance time for the upgrade process.

14. The non-transitory computer-readable storage medium of claim 13, wherein generating the alert message is done before a total of the upgrade reference execution time and the upgrade latency tolerance time for the upgrade process.

15. The non-transitory computer-readable storage medium of claim 13, wherein the upgrade reference execution time for the upgrade process is different for different host machines.

16. The non-transitory computer-readable storage medium of claim 12, wherein the reference execution time for the first task is different for different host machines.

17. The non-transitory computer-readable storage medium of claim 12, wherein the monitoring comprises monitoring the execution of the first task.

* * * * *

UNITED STATES PATENT AND TRADEMARK OFFICE
CERTIFICATE OF CORRECTION

PATENT NO. : 10,437,578 B2
APPLICATION NO. : 15/649440
DATED : October 8, 2019
INVENTOR(S) : Hu et al.

Page 1 of 1

It is certified that error appears in the above-identified patent and that said Letters Patent is hereby corrected as shown below:

In the Specification

In Column 6, Line 35, delete "metada-driven" and insert -- metadata-driven --, therefor.

In Column 18, Line 17, delete ""StopAll Servers"" and insert -- "StopAllServers" --, therefor.

In Column 18, Line 18, delete "StopAll Servers" and insert -- StopAllServers --, therefor.

Signed and Sealed this
Eighth Day of September, 2020

Andrei Iancu
*Director of the United States Patent and Trademark Office*